US012769929B2

(12) United States Patent
Ishizuka

(10) Patent No.: US 12,769,929 B2
(45) Date of Patent: Oct. 20, 2026

(54) INFORMATION PROCESSING APPARATUS, NON-TRANSITORY COMPUTER READABLE MEDIUM, AND METHOD FOR DEFINING AN ARITHMETIC EXPRESSION USING FEATURE AND ARRANGEMENT INFORMATION

(71) Applicant: FUJIFILM BUSINESS INNOVATION CORP., Tokyo (JP)

(72) Inventor: Miho Ishizuka, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 96 days.

(21) Appl. No.: 17/891,796

(22) Filed: Aug. 19, 2022

(65) Prior Publication Data

US 2023/0306193 A1 Sep. 28, 2023

(30) Foreign Application Priority Data

Mar. 22, 2022 (JP) ................................. 2022-045893

(51) Int. Cl.
*G06F 40/174* (2020.01)
*G06F 17/11* (2006.01)
(Continued)

(52) U.S. Cl.
CPC ............ *G06F 40/174* (2020.01); *G06F 17/11* (2013.01); *G06V 30/19173* (2022.01); *G06V 30/28* (2022.01); *G06V 30/412* (2022.01)

(58) Field of Classification Search
None
See application file for complete search history.

(56) References Cited

U.S. PATENT DOCUMENTS 8,050,500 B1 * 11/2011 Batty .................. G06V 30/373 382/187
9,524,429 B2 * 12/2016 Zhang .................. G06V 30/412
(Continued)

FOREIGN PATENT DOCUMENTS

JP H103-074785 A 3/1991
JP 2994336 B1 12/1999
(Continued)

OTHER PUBLICATIONS

Jun. 26, 2023 Extended Search Report issued in European Patent Application No. 22198478.4.
(Continued)

*Primary Examiner* — Ariel Mercado-Vargas
(74) *Attorney, Agent, or Firm* — Oliff PLC

(57) ABSTRACT

An information processing apparatus includes a processor configured to: read plural pieces of character string information written on a form; obtain feature information indicating a feature relating to an arithmetic operation in which numerical information included in the plural pieces of character string information is used and arrangement information indicating a positional relationship between the plural pieces of character string information; and define, on a basis of the feature information and the arrangement information, an arithmetic expression for performing an arithmetic operation using an operator relating to the plural pieces of character string information.

6 Claims, 22 Drawing Sheets

(51) Int. Cl.

| | |
|---|---|
| ***G06V 30/10*** | (2022.01) |
| ***G06V 30/19*** | (2022.01) |
| ***G06V 30/28*** | (2022.01) |
| ***G06V 30/412*** | (2022.01) |

(56) References Cited

U.S. PATENT DOCUMENTS

| | | | | |
|---|---|---|---|---|
| 9,928,225 | B2 * | 3/2018 | Lazarevic | G06F 40/151 |
| 2001/0043740 | A1 | 11/2001 | Ichikawa et al. | |
| 2014/0067631 | A1 * | 3/2014 | Dhuse | G06Q 40/10<br>705/30 |
| 2014/0105501 | A1 * | 4/2014 | Nakaso | G06V 30/32<br>382/182 |
| 2014/0293030 | A1 * | 10/2014 | Galu, Jr. | G06F 15/0225<br>348/61 |
| 2016/0055374 | A1 * | 2/2016 | Zhang | G06V 30/245<br>382/182 |
| 2019/0139280 | A1 | 5/2019 | Hubel | |

FOREIGN PATENT DOCUMENTS

| | | | |
|---|---|---|---|
| JP | 2001-325562 | A | 11/2001 |
| JP | 2015-184815 | A | 10/2015 |
| JP | 2019-175116 | A | 10/2019 |
| JP | 2021-047688 | A | 3/2021 |

OTHER PUBLICATIONS

Sep. 9, 2025 Office Action issued in Japanese Patent Application No. 2022-045893.

* cited by examiner

FIG. 15

| No. | CATEGORY NAME | | | |
|---|---|---|---|---|
| | QUANTITY | AMOUNT OF MONEY | WEIGHT | LENGTH |
| 1 | PIECES | ¥ | GRAMS | CENTIMETERS |
| 2 | PIECE | YEN | g | cm |
| 3 | pcs | DOLLARS | KILOGRAMS | METERS |
| 4 | pc | $ | kg | m |
| 5 | QUANTITY | YUAN | OUNCES | FEET |
| 6 | UNITS | ... | ... | ... |
| 7 | SETS | ... | ... | ... |
| ... | ... | ... | ... | ... |

FIG. 17

| No. | UNIT CATEGORY | | PREDICTED OPERATOR |
|---|---|---|---|
| | LEFT SIDE | RIGHT SIDE | |
| 1 | (NO UNIT) | QUANTITY | MULTIPLICATION (×) |
| 2 | QUANTITY | QUANTITY | MULTIPLICATION (×) |
| 3 | QUANTITY | AMOUNT OF MONEY | MULTIPLICATION (×) |
| 4 | QUANTITY | WEIGHT | MULTIPLICATION (×) |
| 5 | QUANTITY | LENGTH | MULTIPLICATION (×) |
| 6 | AMOUNT OF MONEY | AMOUNT OF MONEY | DIVISION (÷) |
| 7 | LENGTH | LENGTH | DIVISION (÷) |
| 8 | WEIGHT | WEIGHT | DIVISION (÷) |
| ... | ... | ... | ... |

FIG. 18

| No. | UNIT CATEGORY | | USER OPERATOR |
|---|---|---|---|
| | LEFT SIDE | RIGHT SIDE | |
| 1 | (NO UNIT) | QUANTITY | MULTIPLICATION (×) |
| 2 | QUANTITY | QUANTITY | ADDITION (+) |
| 3 | QUANTITY | AMOUNT OF MONEY | MULTIPLICATION (×) |
| 4 | QUANTITY | WEIGHT | MULTIPLICATION (×) |
| 5 | QUANTITY | LENGTH | MULTIPLICATION (×) |
| 6 | AMOUNT OF MONEY | AMOUNT OF MONEY | DIVISION (÷) |
| 7 | LENGTH | LENGTH | DIVISION (÷) |
| 8 | WEIGHT | WEIGHT | DIVISION (÷) |
| ... | ... | ... | ... |

INFORMATION PROCESSING APPARATUS, NON-TRANSITORY COMPUTER READABLE MEDIUM, AND METHOD FOR DEFINING AN ARITHMETIC EXPRESSION USING FEATURE AND ARRANGEMENT INFORMATION

CROSS-REFERENCE TO RELATED APPLICATIONS

This application is based on and claims priority under 35 USC 119 from Japanese Patent Application No. 2022-045893 filed Mar. 22, 2022.

BACKGROUND

(i) Technical Field

The present disclosure relates to an information processing apparatus, a non-transitory computer readable medium, and a method for processing information.

(ii) Related Art

Information processing apparatuses that perform information processing for recognizing characters on images obtained by optically reading forms are known. Japanese Unexamined Patent Application Publication No. 2021-047688, for example, discloses a technique relating to a form recognition method in which a recognition template is created to allow a computer to perform optical character recognition (OCR) on a form image. The technique includes, as steps to be performed by the computer, a first step, in which an instruction to create a recognition temperate for a form image is input on the basis of a user operation, a second step, in which, if a registered first recognition template is applicable to the form image, an OCR result is obtained by applying the first recognition template and the OCR result and information regarding the first recognition template are displayed on a display screen, a third step, in which, if the first recognition template is not applicable to the form image, a second recognition template is created and information regarding the second recognition template is displayed on the display screen, a fourth step, in which, on the display screen, the first or second recognition template is checked and corrected and the first or second recognition template is registered as a setting for applying the first or second recognition template in the OCR for the form image on the basis of user operations, and a fifth step, in which an OCR result is obtained by applying the second recognition template to the form image and displayed on the display screen.

Japanese Unexamined Patent Application Publication No. 2015-184815 discloses a technique relating to a form definition creation apparatus that includes at least a storage unit and a control unit and that creates a format definition of a form to be subjected to character recognition. In the technique, the storage unit includes format definition storage means for storing a format definition of an original form and image storage means for storing an image of the original form read by an image reading apparatus. The control unit includes item position search means for searching the image of the original form for individual reading items based on the format definition of the original form and item association means for moving the reading items of the original form on the basis of a result of the search performed by the item position search means.

SUMMARY

Some forms include areas supposed to be subjected to numerical operations, that is, for example, tabular entry fields. An information processing apparatus that reads a plurality of character strings written on a form, therefore, might need to verify that a plurality of pieces of character string information, including numerical information, written on the form is appropriate for numerical operations. In this case, the numerical information included in the plurality of pieces of character string information corresponding to the plurality of character strings written on the form is sequentially selected, and operators are set between the plurality of pieces of numerical information to define arithmetic expressions. A burden on a user in making settings, however, undesirably increases when the user needs to define an arithmetic expression for each of areas on a form, that is, for example, tabular entry fields.

Aspects of non-limiting embodiments of the present disclosure relate to an information processing apparatus, a non-transitory computer readable medium, and a method for processing information capable of reducing a burden on a user in making settings compared to when the user needs to sequentially select a plurality of pieces of character string information for numerical operations written on a form and set arithmetic expressions for the form.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: read a plurality of pieces of character string information written on a form; obtain feature information indicating a feature relating to an arithmetic operation in which numerical information included in the plurality of pieces of character string information is used and arrangement information indicating a positional relationship between the plurality of pieces of character string information; and define, on a basis of the feature information and the arrangement information, an arithmetic expression for performing an arithmetic operation using an operator relating to the plurality of pieces of character string information.

BRIEF DESCRIPTION OF THE DRAWINGS

An exemplary embodiment of the present disclosure will be described in detail based on the following figures, wherein:

FIG. 15 is a diagram illustrating an example of a category table;

FIG. 17 is a diagram illustrating an example of a prediction table;

FIG. 18 is a diagram illustrating a user prediction table;

DETAILED DESCRIPTION

Figure 1:
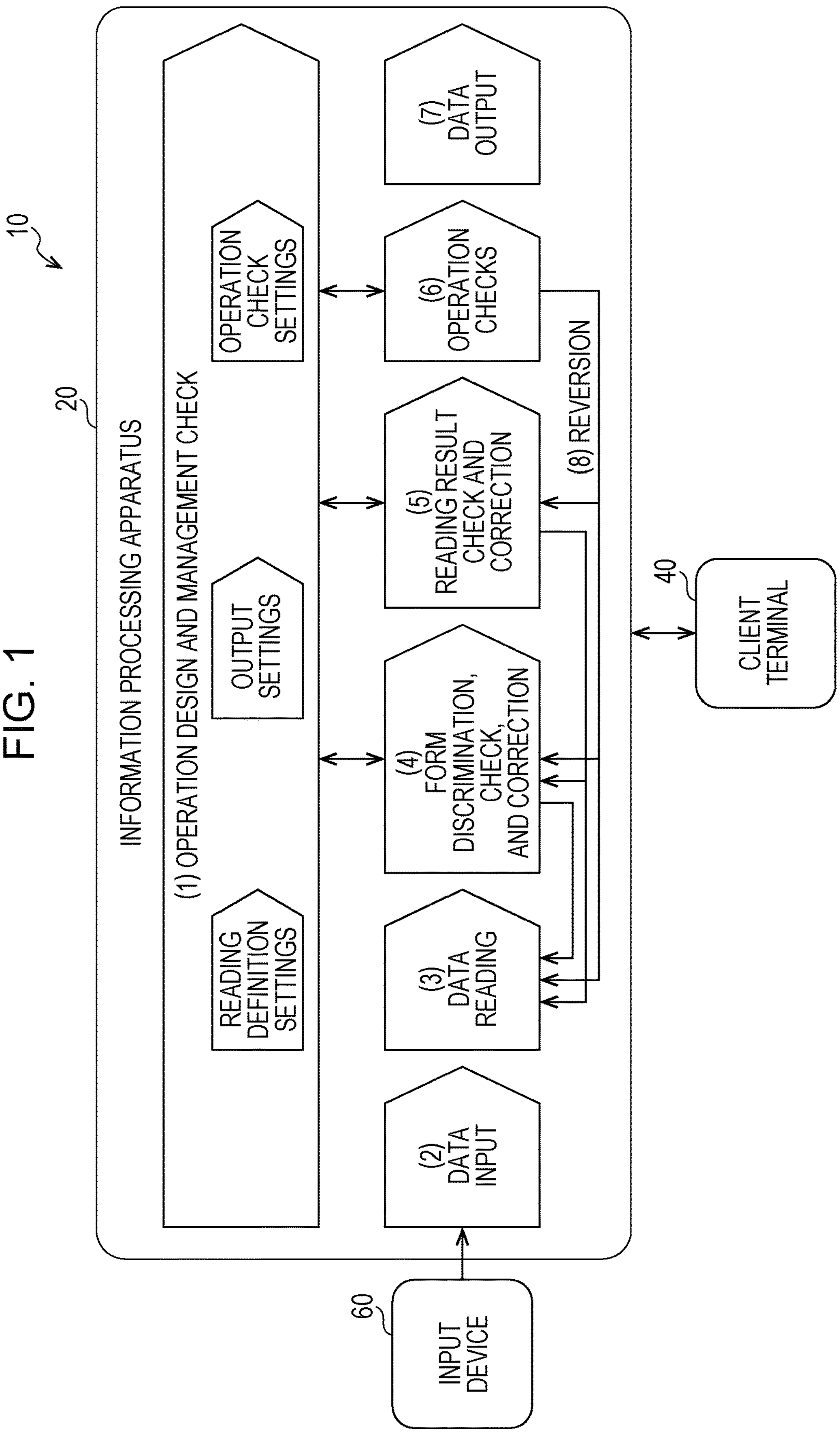
FIG. 1 is a diagram illustrating a schematic configuration of a form system according to an exemplary embodiment.

An exemplary embodiment for implementing the techniques in the present disclosure will be described in detail hereinafter with reference to the drawings. Components and steps that have the same operations, actions, or functions are given the same reference numerals throughout the drawings, and redundant description thereof might be omitted as necessary. The drawings are only shown in a schematic manner so that the techniques in the present disclosure can be fully understood. The techniques in the present disclosure, therefore, are not limited to illustrated examples. In the exemplary embodiment, description of elements that are not directly related to the present disclosure and known elements might be omitted.

FIG. 1 is a diagram illustrating a schematic configuration of a form system 10 according to the present exemplary embodiment.

As illustrated in FIG. 1, the form system 10 includes an information processing apparatus 20, a client terminal 40, and an input device 60. These apparatuses are connected to a network, which is not illustrated, and communicable with one another over the network. The network is, for example, the Internet, a local area network, a wide area network (WAN), or the like.

The information processing apparatus 20 manages a series of processes in which OCR is performed on image data regarding a plurality of pages of a document including forms input through the input device 60 and a result of the OCR is output to a predetermined destination. A specific configuration and operations of the information processing apparatus 20 will be described later.

The client terminal 40 transmits various instructions relating to OCR to the information processing apparatus 20. The various instructions include, for example, an instruction to start to read information regarding image data, and an instruction to display a result of reading of information regarding image data. The client terminal 40 also displays, in accordance with various received instructions, various pieces of information including a result of OCR performed by the information processing apparatus 20 and a notification about OCR. The client terminal 40 is, for example, a server computer or a general-purpose computer such as a personal computer (PC). Although FIG. 1 illustrates only one client terminal 40, a plurality of client terminals 40 may be provided, instead, and used for, for example, different types of processing.

The input device 60 inputs image data to be subjected to OCR to the information processing apparatus 20. The input device 60 is, for example, a server computer, a general-purpose computer such as a PC, or an image forming apparatus having a scanning function, a printing function, a facsimile function, and/or the like. In addition to the input device 60, the client terminal 40 may also be capable of inputting image data to the information processing apparatus 20.

Next, an outline of the form system 10 will be described.

In the form system 10, the information processing apparatus 20 performs OCR on image data input through the input device 60 and outputs a result of the OCR to a predetermined destination.

In the OCR, the information processing apparatus 20 manages various processes including (1) operation design and management check, (2) data input, (3) data reading, (4) form discrimination, check, and correction, (5) reading result check and correction, (6) operation checks, (7) data output, and (8) reversion. In the present exemplary embodiment, the OCR includes not only a process for reading characters, signs, and the like from image data but also post-processing such as correction of characters.

In an example of the management of the various processes, the information processing apparatus 20 automatically performs (1) operation design and management check, (2) data input, (3) data reading, (6) operation checks, and (7) data output. As for (4) form discrimination, check, and correction and (5) reading result check and correction, a user makes inputs using the client terminal 40. The information processing apparatus 20 may automatically perform (8) reversion, or the user may make an input for (8) reversion using the client terminal 40.

In (1) operation design and management check, job rules including reading definition settings, output settings, and operation check settings are created. In the reading definition settings, for example, reading areas, in which image data is to be read in (3) data reading, are set. More specifically, for example, a definition is set such that item values, which are values to be read, to the right of items to be extracted as keys will be read. In the output settings, for example, a file format and a destination of data output in (7) data output are set. In the operation check settings, for example, a format including required input items and the number of characters that can be input on forms to be detected in (6) operation checks is set.

In (2) data input, image data is input from the input device 60. The input image data is registered as a job, which is a unit for which (3) data reading is to be performed.

In (3) data reading, the image data in the job is read using some job rules selected by the user for the job from the job rules created in (1) operation design and management check.

In this process, for example, discrimination of forms included in the image data in the job (hereinafter referred to as "form discrimination") and reading of characters and signs in the reading areas are performed.

In (4) form discrimination, check, and correction, the image data in the job is divided into records indicating the form included in the job on the basis of a result of the forms discrimination performed in (3) data reading. The records are then displayed in this process, and the user checks and corrects the result of the form discrimination.

In (5) reading result check and correction, a result of the reading of characters and signs in the reading areas performed in (3) data reading is displayed, and the user checks and corrects the result of the reading.

In (6) operation checks, errors in each of the preceding processes are detected on the basis of the operation check settings included in the job rules selected by the user for the job from the job rules created in (1) operation design and management check. A result of the detection may be presented to the user.

In (7) data output, output data is created and output to a predetermined destination using the output settings included in the job rules selected by the user for the job from the job rules created in (1) operation design and management check.

In (8) reversion, a process performed in the OCR is reverted to another process one or more steps before. For example, the user requests reversion using the client terminal 40 during (4) form discrimination, check, and correction, (5) reading result check and correction, or the like. Alternatively, for example, a manager requests reversion using his/her client terminal 40 in accordance with a result of a check conducted by the manager between (6) operation checks and (7) data output.

In the OCR, (1) operation design and management check is performed before (3) data reading and the later processes are performed, that is, before the form system 10 is operated. Alternatively, (1) operation design and management check may be performed while (3) data reading or one of the later processes is being performed, that is, while the form system 10 is being operated. For example, the job rules created in (1) operation design and management check before the form system 10 is operated may be corrected in accordance with a result of (5) reading result check and correction, which is performed while the form system 10 is being operated.

Information Processing Apparatus

Figure 2:
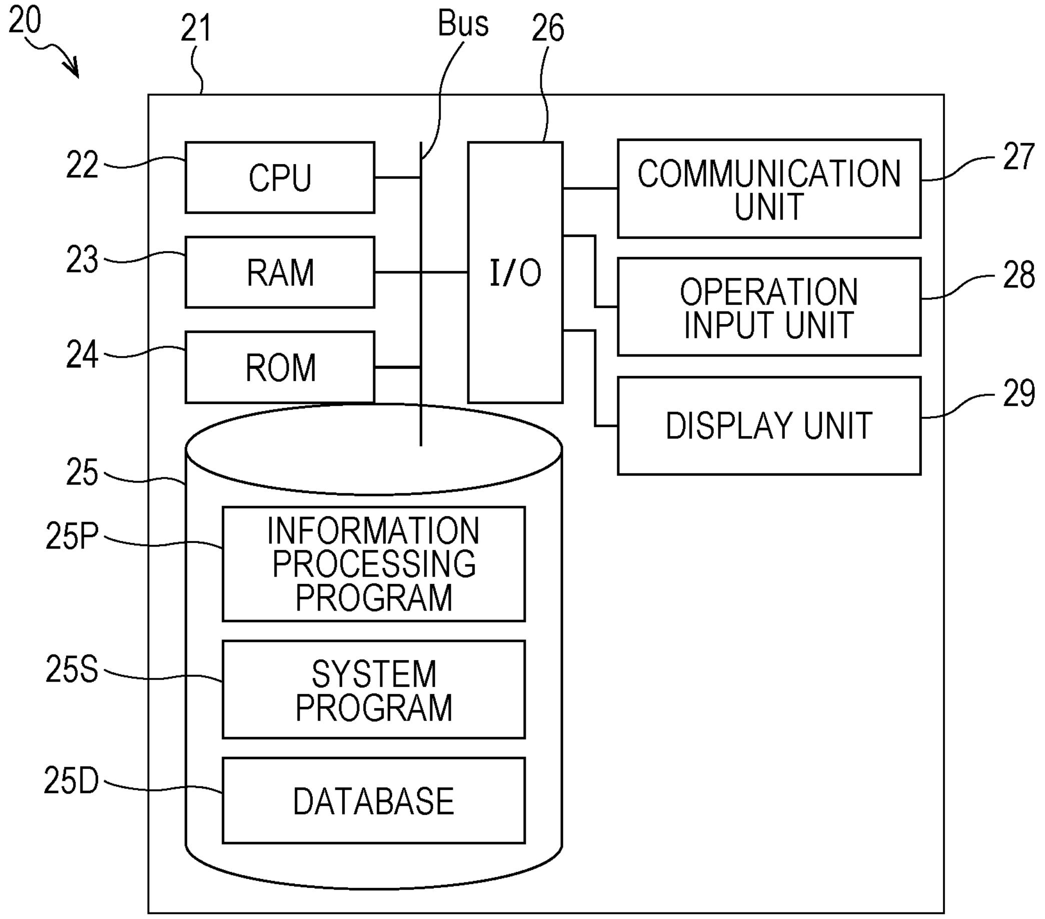
FIG. 2 is a diagram illustrating an example of an electrical schematic configuration of an information processing apparatus according to the exemplary embodiment.

Next, an example of the configuration of the information processing apparatus 20 will be described with reference to FIG. 2. FIG. 2 is a diagram illustrating an example of an electrical schematic configuration of the information processing apparatus 20 according to the present exemplary embodiment. The information processing apparatus 20 is, for example, a server computer or a general-purpose computer such as a PC.

More specifically, as illustrated in FIG. 2, the information processing apparatus 20 includes a computer 21. The computer 21 includes a central processing unit (CPU) 22, a random-access memory (RAM) 23, a read-only memory (ROM) 24, a storage unit 25, and an input/output port (I/O) 26. The CPU 22, the RAM 23, the ROM 24, the storage unit 25, and the I/O 26 are connected to one another by a bus Bus.

Functional units such as a communication unit 27 for achieving communication with external apparatuses, an operation input unit 28 that enables the user to input operations, and a display unit 29 that displays images are connected to the I/O 26. These functional units can communicate with the CPU 22 through the I/O 26.

The computer 21 may be achieved as a sub-control unit that controls a part of the information processing apparatus 20 or may be achieved as a control unit that controls the entirety of the information processing apparatus 20. An integrated circuit (IC) such as a large-scale integration (LSI) circuit or an IC chipset, for example, is used for a part or the entirety of each of blocks of the computer 21. Independent circuits may be used for different blocks, or a circuit on which some or all of the blocks are integrated together may be used. The blocks may be integrated with one another, or some blocks may be separately provided. In each of the blocks, a part of the block may be separately provided. The computer 21 need not be integrated using an LSI circuit, and a dedicated circuit or a general-purpose processor may be used, instead.

The storage unit 25 stores an information processing program 25P for causing the information processing apparatus 20 to function as an information processing apparatus in the present disclosure. The CPU 22 reads the information processing program 25P from the storage unit 25 and loads the information processing program 25P into the RAM 23 to perform processing. By executing the information processing program 25P, the information processing apparatus 20 operates as the information processing apparatus in the present disclosure. The information processing program 25P may be provided in a storage medium such as a compact disc read-only memory (CD-ROM). Specific processes performed by the information processing apparatus 20 will be described later.

An auxiliary storage device such as a hard disk drive (HDD), a solid-state drive (SSD), or a flash memory, for example, is used as the storage unit 25.

The information processing program 25P may be stored in a ROM 12C, instead. Alternatively, for example, the information processing program 25P may be installed on the information processing apparatus 20 in advance. Alternatively, the information processing program 25P may be achieved by installing, on the information processing apparatus 20, program information stored in a nonvolatile storage medium or distributed over the network, which is not illustrated. Examples of the nonvolatile storage medium include a CD-ROM, a magneto-optical (MO) disk, an HDD, a digital versatile disc read-only memory (DVD-ROM), a flash memory, and a memory card.

The storage unit 25 also stores a system program 25S for the information processing apparatus 20 to achieve functions in OCR. The CPU 22 reads the system program 25S from the storage unit 25 and loads the system program 25S into the RAM 23 to perform OCR. By executing the system program 25S, the information processing apparatus 20 becomes able to achieve system functions in OCR.

Although the information processing program 25P and the system program 25S are separate programs in the present exemplary embodiment, the information processing program 25P may be executed as one of processes included in the system program 25S, instead.

The storage unit 25 also stores a database 25D including various pieces of information available to the information processing apparatus 20. The database 25D need not necessarily be stored in the storage unit 25 in advance. For example, the database 25D may be stored in an external apparatus that is not illustrated and obtained from the external apparatus through a communication link.

The communication unit 27 is connected to a communication network and achieves communication between the information processing apparatus 20 and external apparatuses. The communication network is a concept including a network for achieving data communication between devices through a wired and/or wireless communication link. For example, the communication network may be a narrow area communication network (e.g., a LAN) that achieves data communication at a corporate base or a wide area communication network (e.g., a wide area network (WAN)), such as the Internet, that achieves data communication through a public communication link.

Devices for inputting operations, such as a keyboard and a mouse, are provided as the operation input unit 28.

A liquid crystal display (LCD) or an organic electroluminescent (EL) display, for example, is used as the display unit 29. A touch panel having a function of the operation input unit 28 may be used as the display unit 29, instead. The operation input unit 28 and the display unit 29 receive various instructions from the user of the information processing apparatus 20. The display unit 29 displays results of processes performed in accordance with instructions received from the user, notifications about the processes, and various other pieces of information.

Figure 3:
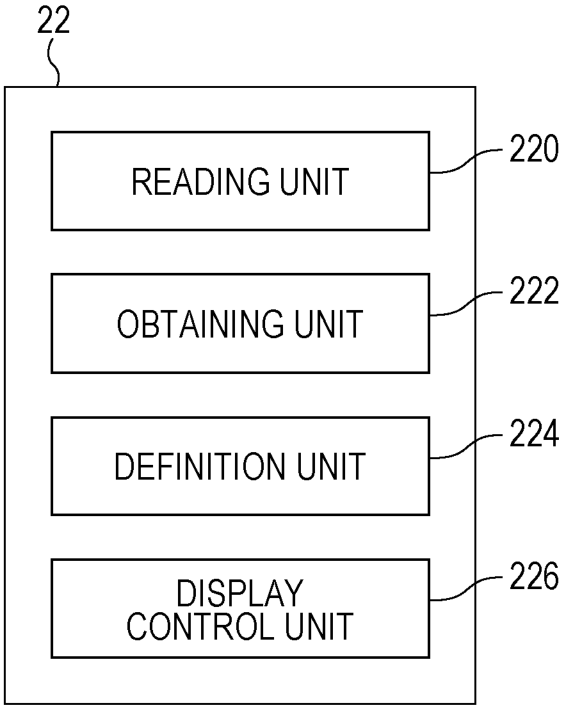
FIG. 3 is a diagram illustrating an example of a functional configuration of the information processing apparatus according to the exemplary embodiment.

FIG. 3 is a block diagram illustrating an example of a functional configuration of the information processing apparatus 20 according to the present exemplary embodiment.

As illustrated in FIG. 3, the CPU 22 of the information processing apparatus 20 according to the present exemplary embodiment functions as the information processing apparatus in the present disclosure by executing the information processing program 25P. The information processing apparatus in the present disclosure includes functional units that function as a reading unit 220, an obtaining unit 222, a definition unit 224, and a display control unit 226 respectively.

The reading unit 220 is a functional unit that reads an image of a form as a paper document and character string information written on the form. In the present exemplary embodiment, the reading unit 220 reads character string information by obtaining a reading result (character string information) corrected or identified using a result of character recognition performed on an image of a form on which character strings are written. More specifically, the reading unit 220 obtains character string information at an end of the reading result check and correction ((5) in FIG. 1) in the OCR performed by the information processing apparatus 20.

The obtaining unit 222 is a functional unit that obtains feature information and arrangement information from a plurality of pieces of character string information read by the reading unit 220. The obtaining unit 222 obtains the feature information and the arrangement information from character string information read by the reading unit 220 in accordance with a predetermined obtaining condition.

The obtaining condition is a condition at a time when feature information and arrangement information are obtained from a plurality of pieces of character string information read by the reading unit 220. The obtaining unit 222 has a function of extracting the obtaining condition from the storage unit 25 (e.g., the database 25D).

The feature information indicates features relating to an arithmetic operation based on numerical information included in a plurality of pieces of character string information read by the reading unit 220. When it is expected that a numerical operation will be performed using values indicated by a plurality of pieces of character string information, at least one of the plurality of pieces of character string information might include information (category information) regarding a type (hereinafter referred to as a "category") of unit to be used in the numerical operation as a feature relating to the numerical operation. That is, the feature information indicates a type of numerical operation to be performed for a plurality of pieces of character string information and includes category information indicating a type of unit to be used in the numerical operation. The category information may be, for example, information indicating a measure of quantity, amount of money, weight, or length. A plurality of character strings relating to prices of articles are expected to be subjected to an operation where the sum of results of basic arithmetic operations is obtained using character string information when the character strings include character strings indicating prices of the articles and the quantity of the articles.

A condition for identifying a category on the basis of a correspondence character string information and category information, therefore, is an example of an obtaining condition for feature information.

The arrangement information indicates a positional relationship (e.g., arrangement) between a plurality of pieces of character string information read by the reading unit 220. A plurality of pieces of character string information to be subjected to an arithmetic operation are often arranged close to each other. In the present exemplary embodiment, therefore, information indicating a positional relationship between a plurality of pieces of character string information is obtained. The arrangement information may be, for example, tabular information indicating a positional relationship between a plurality of pieces of character string information adjacent to each other in at least one direction. Alternatively, information indicating a positional relationship between a plurality of pieces of character string information included in a setting area set on a form may be used as the arrangement information.

A condition for applying information indicating a positional relationship between a plurality of pieces of character string information, a tabular correspondence, or a positional relationship between a plurality of pieces of character string information included in a set setting area, therefore, is an example of the obtaining condition for feature information.

The definition unit 224 is a functional unit that defines an arithmetic expression for performing an arithmetic operation using an operator between a plurality of pieces of character string information read by the reading unit 220. For example, the definition unit 224 estimates operators between a plurality of pieces of numerical information included in a plurality of pieces of character string information on the basis of feature information (category information) and arrangement information. The definition unit 224 also defines, using the estimated operators, an arithmetic expression including an arithmetic term in which one of the operators is used between some of the plurality of pieces of numerical information included in the plurality of pieces of character string information and, as an operation result, numerical information included in one of the plurality of pieces of character string information other than some of the plurality of pieces of character string information corresponding to the some of the plurality of pieces of numerical information. The definition unit 224 has a function of extracting, from the storage unit 25 (e.g., the database 25D), definition conditions to be used to define an arithmetic operation.

The definition conditions include a condition used when an operator between a plurality of pieces of numerical information included in a plurality of pieces of character string information on the basis of feature information (category information) and arrangement information. The definition conditions also include a condition used when an operator is given between a plurality of pieces of character string information to estimate an arithmetic expression. More specifically, application of information indicating a correspondence between category information (e.g., information indicating a unit) regarding a plurality of pieces of character string information according to arrangement information and an operator is an example of the definition conditions.

The definition unit 224 has a function of verifying conformity of such an arithmetic expression.

The conformity refers to a degree of consistency between a plurality of pieces of character string information read by the reading unit 220 and information indicating a result of an arithmetic operation based on a defined arithmetic expression using the plurality of pieces of character string information. The degree of consistency may be an index indicating whether the plurality of pieces of character string information and the result of the arithmetic operation match. In the present exemplary embodiment, the definition unit 224 verifies the conformity by determining whether a plurality of pieces of character string information read by the reading unit 220 match information based on a defined arithmetic operation. That is, the definition unit 224 verifies whether the defined arithmetic operation is available by determining whether the plurality of pieces of character string information matches the information based on the arithmetic expression.

The display control unit 226 is a functional unit that displays, on the display unit 29, information (e.g., an arithmetic expression) indicating a result of definition performed by the definition unit 224.

Next, the operations performed by the information processing apparatus 20 according to the present exemplary embodiment will be described.

In the present exemplary embodiment, the operation checks ((6) in FIG. 6) in the OCR performed by the information processing apparatus 20 on image data regarding forms input through the input device 60 will be described. In the operation checks, a process for defining an arithmetic expression relating to a plurality of character strings read from one of the forms is performed. That is, in the operation checks, an arithmetic expression for a plurality of character strings read from a form is defined using the operation check settings included job rules for a job selected by the user from job rules created in advance.

Figure 4:
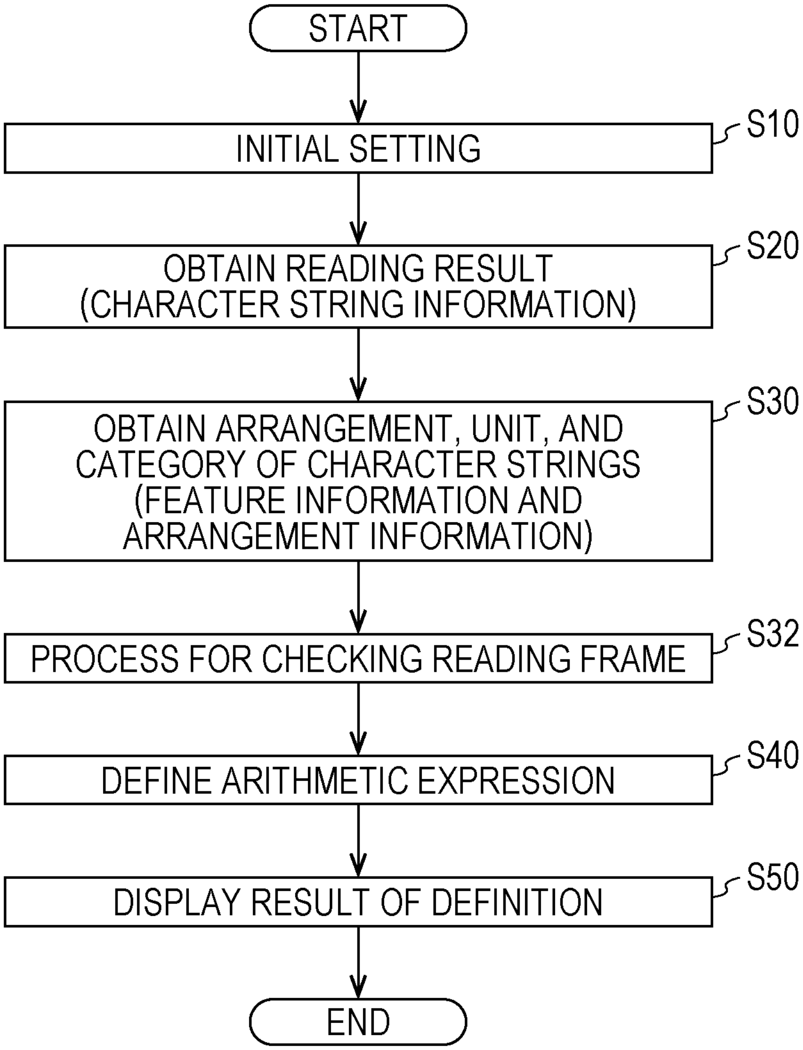
FIG. 4 is a flowchart illustrating an example of a procedure of information processing achieved by an information processing program according to the exemplary embodiment.

FIG. 4 is a flowchart illustrating an example of a procedure of information processing achieved by the information processing program 25P according to the present exemplary embodiment.

First, the information processing apparatus 20 is instructed to activate the information processing program 25P, and the CPU 22 performs the following steps.

In step S10, initial setting relating to the operation checks, namely numerical calculation checks in the present exemplary embodiment, is performed. In the initial setting, various pieces of information, such as operation check names for identifying content of the operation checks, are set.

In step S20, a reading result is obtained by obtaining character string information read from a form on which character strings are written. The character string information indicating the reading result can be obtained from a result obtained at an end of the reading result check and correction ((5) in FIG. 1) in the OCR performed by the information processing apparatus 20 by executing the system program 25S. The processing in step S10 is an example of a function of the reading unit 220 illustrated in FIG. 3.

In step S30, information indicating arrangement, a unit, and a category is obtained for the character string information regarding the read form. The processing in step S30 is another example of the function of the obtaining unit 222 illustrated in FIG. 3.

In step S32, a process for checking a reading frame, in which the user is prompted to check whether to continue the operation checks using a reading frame extracted when the information is obtained in step S30, is performed.

Figure 5:
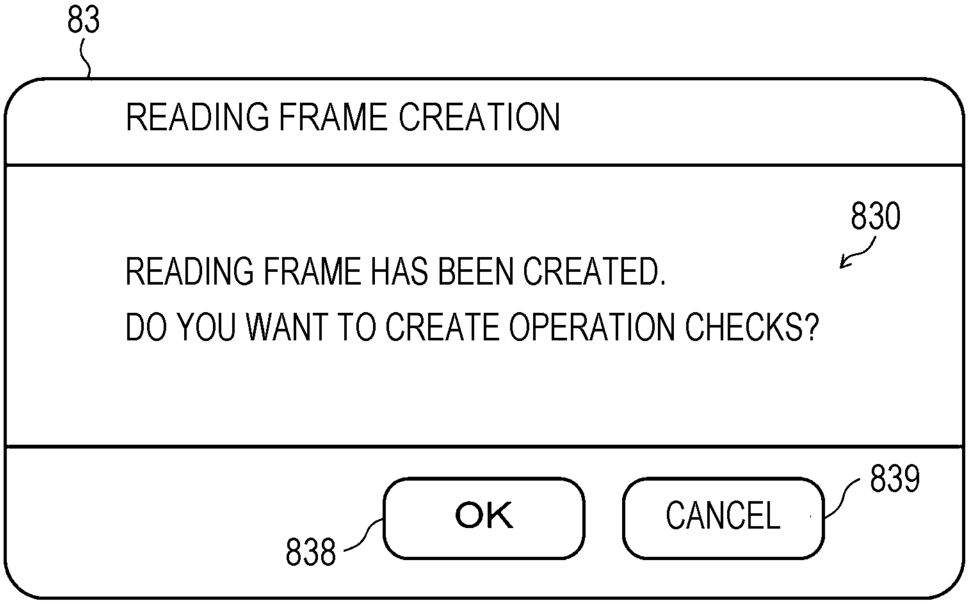
FIG. 5 is a diagram illustrating an example of an inquiry screen relating to a process for checking a reading frame.

FIG. 5 is a diagram illustrating an inquiry screen 83, which is an example of a screen displayed in the process for checking a reading frame.

The inquiry screen 83 includes a display area 830 for a message for prompting the user to check whether to continue the operation checks. The inquiry screen 83 also includes an OK button 838 for continuing the operation checks and a cancel button 839 for canceling the operation checks. If the user presses the OK button 838, the information processing proceeds to step S40. If the user presses the cancel button 839, the information obtained so far is discarded, and the information processing returns to step S10 or the processing routine is forcibly terminated.

By prompting the user to check whether to continue the operation checks, the processing in step S32 can reduce unnecessary processing caused, when the extracted reading frame does not correspond to numerical calculation as described later, by proceeding with the operation checks with the reading frame.

In step S40 illustrated in FIG. 4, the CPU 22 obtains the information indicating the arrangement, the unit, and the category for the character string information regarding the read form and defines an arithmetic expression. That is, the CPU 22 defines an arithmetic expression on the basis of the information indicating the arrangement, the unit, and the category of the character string information obtained in step S20. The processing in step S40 is an example of a function of the definition unit 224 illustrated in FIG. 3.

In step S50, the arithmetic expression defined in step S40 is displayed, and the information processing achieved by the information processing program 25P ends. The processing in step S50 is an example of a function of the display control unit 226 illustrated in FIG. 3.

Next, information processing including the above-described process for defining an arithmetic expression will be described in detail.

If the user requests setting of operation rules after the setting of job rules is completed for the operation checks included in the job rules, the information processing apparatus 20 performs processing for the operation check settings.

Figure 6:
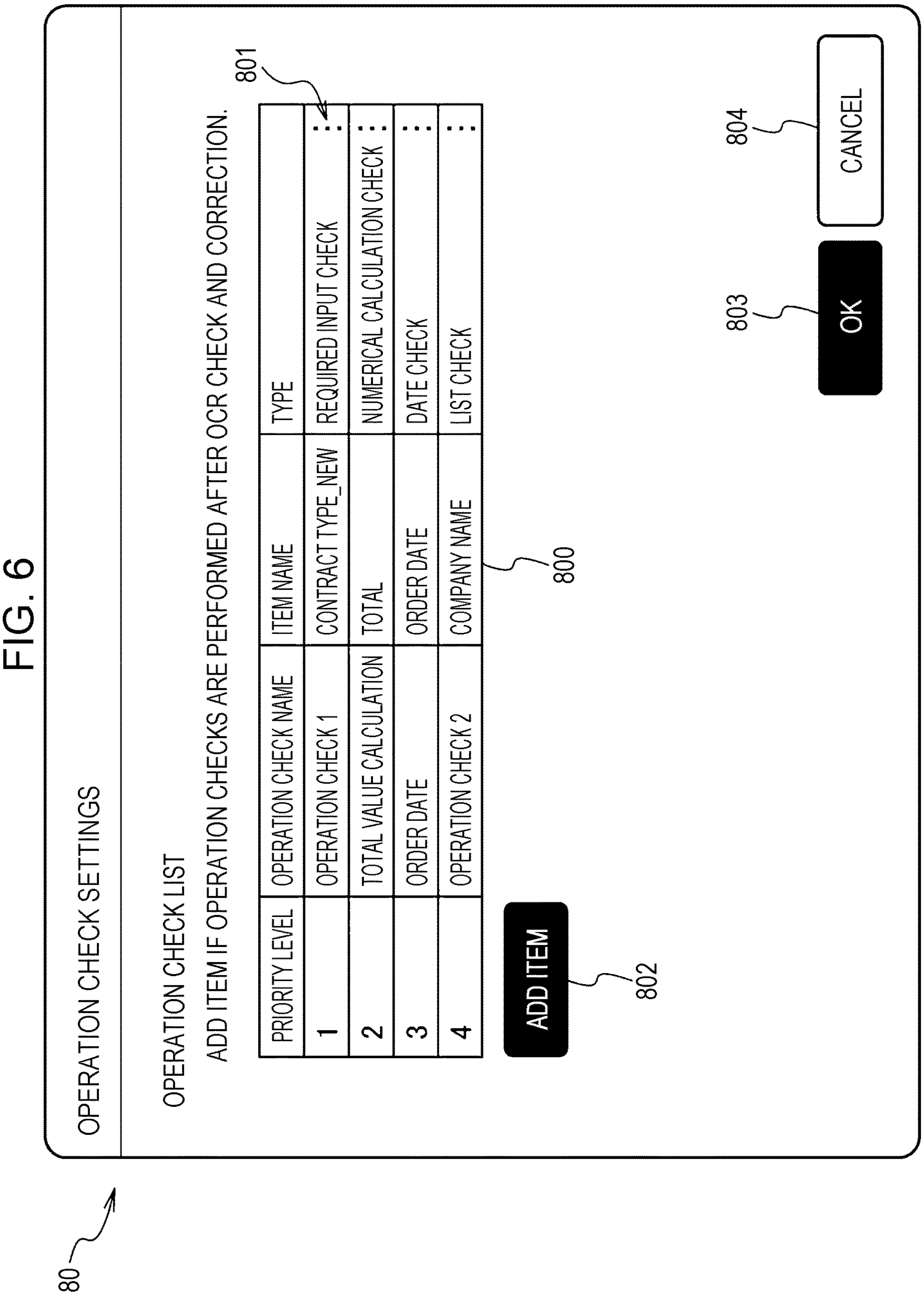
FIG. 6 is a diagram illustrating an example of a setting screen relating to operation check settings.

FIG. 6 is a diagram illustrating an example of a setting screen for an operation check list relating to the operation check settings.

A setting screen 80 illustrated in FIG. 6 is displayed by performing the processing for the operation check settings. The setting screen 80 is used to prompt the user to check types and settings of operation checks to be performed. An operation check list 800 indicating types of operation checks to be performed on the basis of the settings is displayed in the setting screen 80. FIG. 6 illustrates an operation check list 800 at a time when a required input check, a numerical calculation check, a date check, and a list check have been added as types of operation checks. The operation check list 800 is registered, for each of the operation checks to be performed, as a record in which a priority level, an operation check name, an item name, and a type are associated with one another. The priority level is information indicating order of execution of a corresponding operation check among the operation checks included in the operation check list 800. The operation check name is information indicating a name of a corresponding operation check. The item name is information indicating an item to be checked in a corresponding operation check. The type is information indicating a type of corresponding operation check. The operation check list 800 illustrated in FIG. 6 is not displayed for initial processing for the operation check settings.

In the setting screen 80, the user can set the operation check list 800 and the operation checks of different types using buttons. The setting screen 80 includes an add item button 802 for adding a new operation check to the operation check list 800. The setting screen 80 also includes an OK button 803 for ending the setting of the operation check list 800 and a cancel button 804 for canceling the setting of the operation check list 800. In the setting of the operation checks, one of edit processes such as edit, removal, and priority level change can be selected by pressing one of edit buttons (indicated by three dots in FIG. 6) 801. If one of the edit buttons 801 is pressed and then one of the edit processes is selected, the edit process for settings of a corresponding operation check starts.

A process for adding a new operation check (the initial processing for the operation check settings) will be described hereinafter. If the add item button 802 is pressed, the process for adding a new operation check is performed, and settings relating to the new operation check are made.

Figure 7:
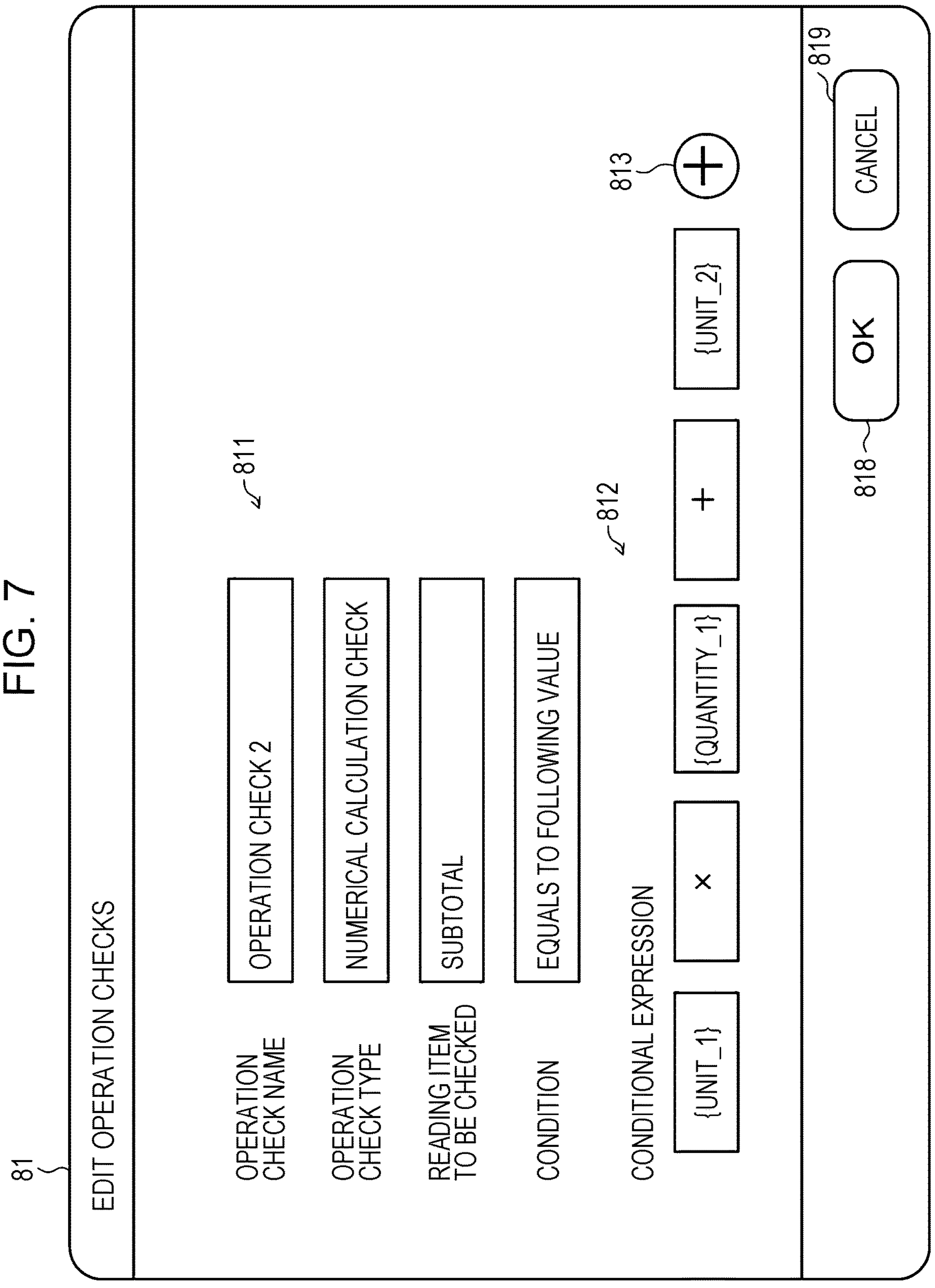
FIG. 7 is a diagram illustrating an example of a setting screen relating to a process for editing the operation check settings.

FIG. 7 is a diagram illustrating an example of a setting screen relating to a process for editing operation check settings as settings relating to a new operation check.

When the process for adding a new operation check is performed, a setting screen 81 is displayed. Input fields 811 for inputting information regarding an operation check are displayed in the setting screen 81. The input fields 811 are editable. The input fields 811 may be displayed as drop-down lists, for example, so that an item to be input can be selected from among predetermined items.

The setting screen 81 includes an OK button 818 for ending the setting of an operation check and a cancel button 819 for canceling the setting of an operation check. If the OK button 818 is pressed, the setting of the operation check list restarts, and the setting screen 80 for the operation check list illustrated in FIG. 6 is displayed again. If new items of an operation check are created, the created items are added to the operation check list 800. If the cancel button 819 is pressed, on the other hand, the items are discarded. The setting of the operation check list then restarts, and the setting screen 80 for the operation check list illustrated in FIG. 6 is displayed again.

A process for setting information input in the input fields 811 is an example of the processing in step S20.

The setting screen 81 also includes, under the input fields 811, input fields 812 for inputting a conditional expression for a numerical calculation check. The input fields 812 are editable. The user can input a setting to each of the input fields 812.

When the user needs to sequentially input conditional expressions for numerical calculation checks, however, a burden on the user increases. In the present exemplary embodiment, therefore, a computer assists the user in making settings for a numerical calculation check by automatically defining an arithmetic expression and proposing candidate arithmetic expressions as described above.

More specifically, a request button 813 for assisting the user in inputting a conditional expression (arithmetic expression) is displayed to the right of the input fields 812 illustrated in FIG. 7. When the request button 813 is pressed, processing relating to setting of a conditional expression for a numerical calculation check in a form starts. In the processing, a reading frame for the form is created, and a conditional expression for performing a numerical calculation check in the created reading frame is defined.

First, the information processing apparatus 20 obtains information to be used to define a conditional expression as an arithmetic expression, that is, a reading result (character string information) (step S20 in FIG. 4), and then obtains arrangement, a unit, and a category (feature information and arrangement information) of character strings (step S30 in FIG. 4).

The obtaining of information (feature information and arrangement information) regarding the arrangement, the unit, and the category of the character strings is achieved through a process for creating a reading frame on a form.

Figure 8:
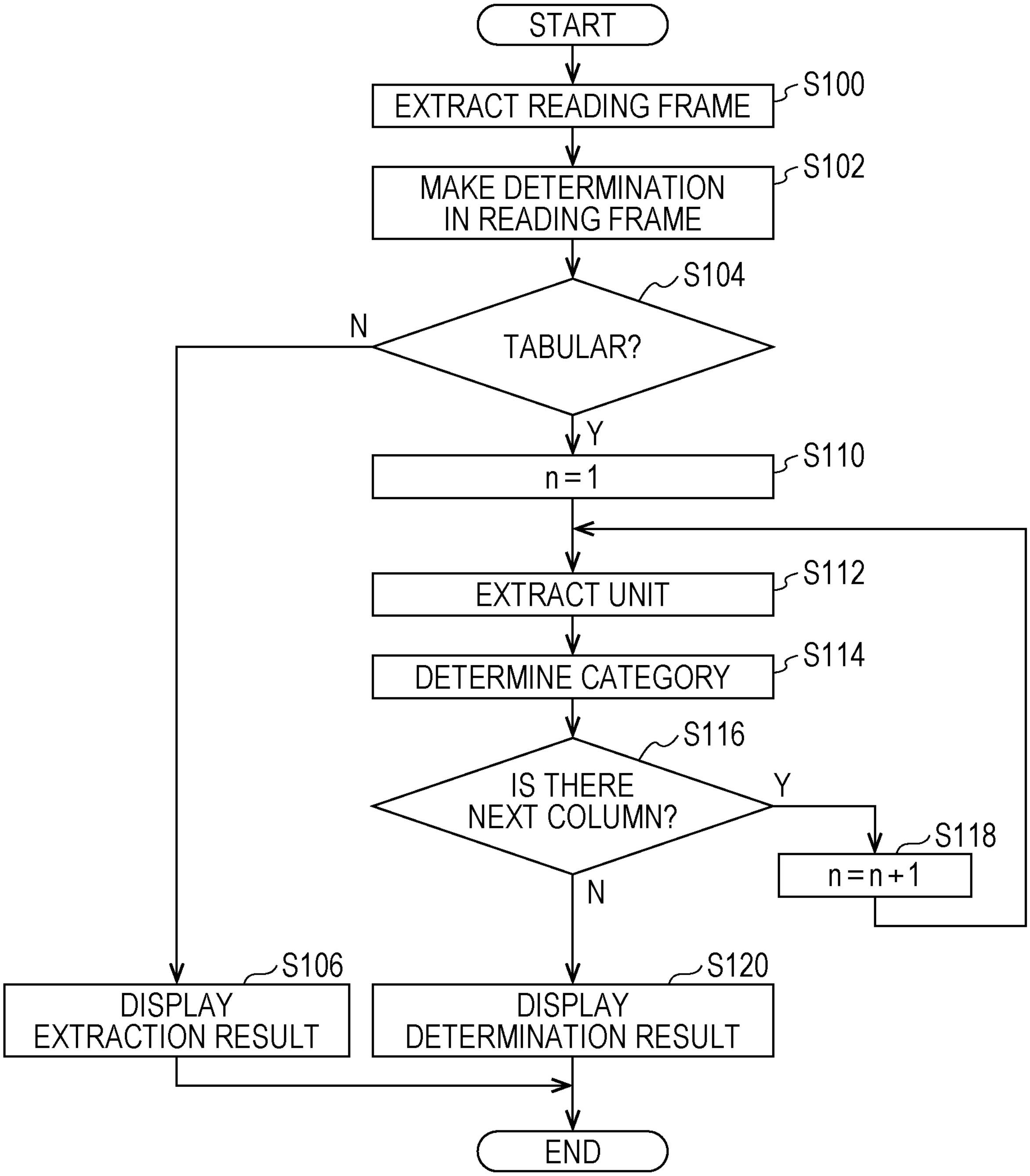
FIG. 8 is a flowchart illustrating an example of a procedure of a process for creating a reading frame.

FIG. 8 is a flowchart illustrating an example of a procedure of the process for creating a reading frame included in the information processing achieved by the information processing program 25P.

First, when activation of the process for creating a reading frame included in the information processing program 25P is requested, the CPU 22 performs the following steps.

In step S100, the CPU 22 extracts a reading frame from a read form. A range specified by the user may be extracted as the reading frame, or a range including a plurality of character strings may be automatically extracted as the reading frame.

Figure 9:
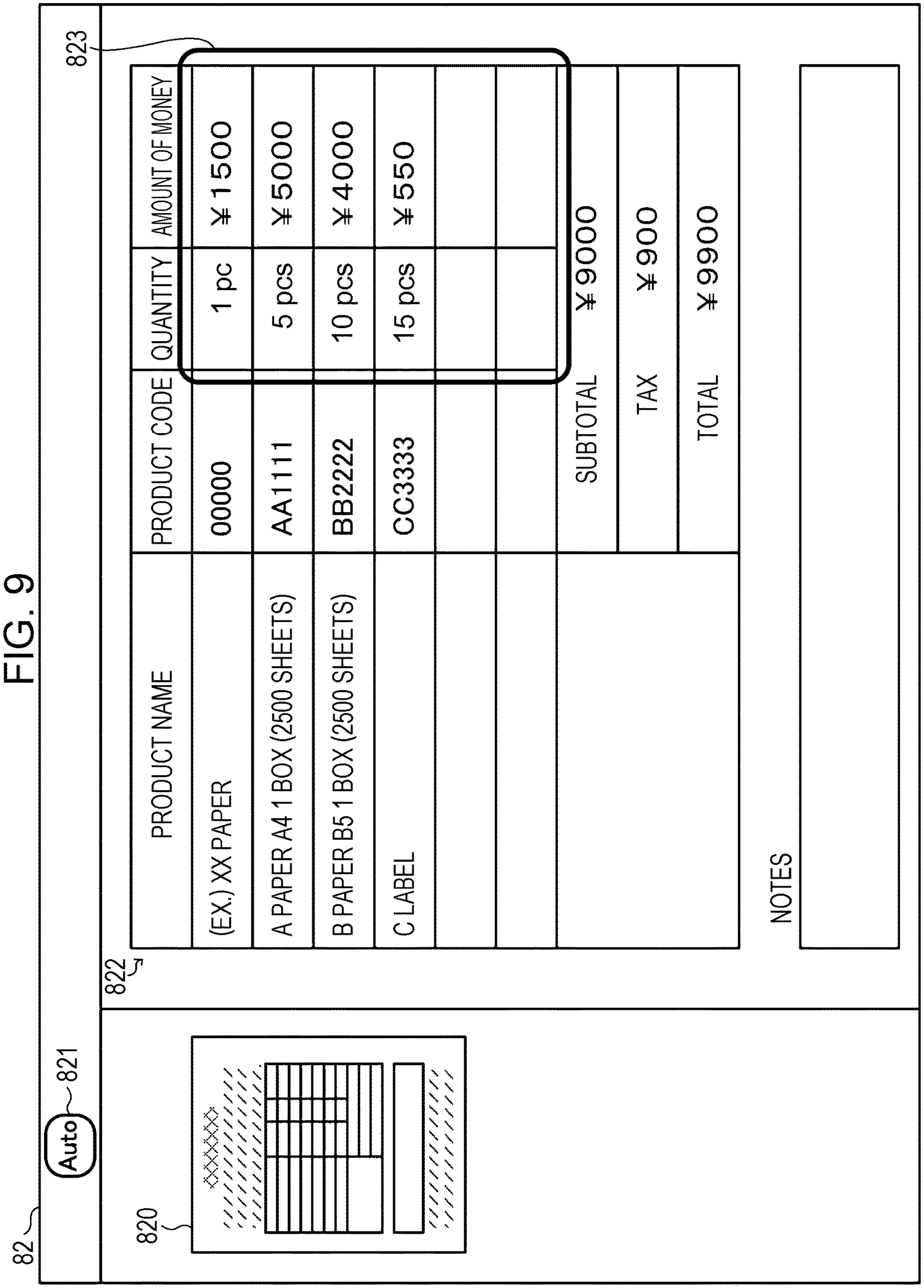
FIG. 9 is a diagram illustrating an example of a creation screen for a reading frame.

FIG. 9 is a diagram illustrating an example of a creation screen for a reading frame displayed in the process for creating a reading frame.

As illustrated in FIG. 9, an image (e.g., a thumbnail image of a scan image of a form) 820 obtained by reducing in size a form for which an operation check (i.e., a numerical calculation check) is set so that the entirety of the form can be viewed is displayed in the creation screen 82. A detailed image (e.g., an enlarged image of a part of the scan image of the form) 822 of the form is also displayed in the creation screen 82. A request button 821 for establishing an automatic extraction mode, in which a reading frame is automatically extracted, is also displayed in the creation screen 82.

The image 820 displayed in the creation screen 82 for a reading frame is not limited to a read image (e.g., a scan image of a form), and may be a format image of a form for which an operation check is to be set. Data stored in the storage unit 25 in advance may be obtained as the format image, or the format image may be obtained from an external apparatus through communication.

If the user presses the request button 821, the processing illustrated in FIG. 8 is performed. The user need not necessarily press the request button 821, and the process illustrated in FIG. 8 may be automatically performed, instead. In FIG. 9, an example of an extraction result displayed on the screen in step S100 is illustrated as a reading frame 823.

Next, in step S102 illustrated in FIG. 8, the CPU 22 performs a determination process for a reading frame. More specifically, the CPU 22 determines how likely it is that an image inside the reading frame extracted in step S100 includes character string information to be subjected to a numerical calculation check as an operation check by determining whether the image includes a plurality of pieces of character string information shown in a tabular format. This is because a plurality of pieces of character string information shown in a tabular format are more likely to be definable by an arithmetic expression based on a numerical operation than a plurality of pieces of character string information arranged randomly.

In step S104, the CPU 22 determines, on the basis of a result of the determination in step S102, whether the image inside the reading frame is shown in a tabular format. If a result of step S104 is negative, the process proceeds to step S106. If the result of step S104 is positive, the process proceeds to step S110.

In step S106, the processing routine ends after the extraction result in step S100 is displayed on the screen.

If the image inside the reading frame is shown in a tabular format, on the other hand, information (feature information and arrangement information) regarding arrangement, a unit, and a category of the character string information is obtained in processing in step S110 and later steps.

First, in step S110, a counter variable n is set at "1" (n=1), and in a next step S112, information indicating a unit of character string information in an n-th column of a first row of the tabular format is extracted. In a next step S114, a category is determined for each of the pieces of character string information. Details of a process for extracting information indicating a unit (hereinafter referred to as a "unit extraction process") will be described later, but in the unit extraction process, character string information regarding candidates for a unit in an arithmetic expression is extracted. Details of a process for determining a category (hereinafter referred to as a "category determination process") will be described later, but if character string information indicating a unit matches one of predetermined keywords in the category determination process, a category indicated by a unit corresponding to the keyword is identified.

In step S116, the CPU 22 determines whether there is a next column by determining whether there is character string information in a column remaining in the first row of the tabular format. If a result of step S116 is positive, the counter variable n is incremented (n=n+1) in step S118, and the process returns to step S112. If the result of step S116 is negative, on the other hand, a result of step S114, that is, category information (FIG. 10), is displayed, and then the processing routine ends.

Figure 10:
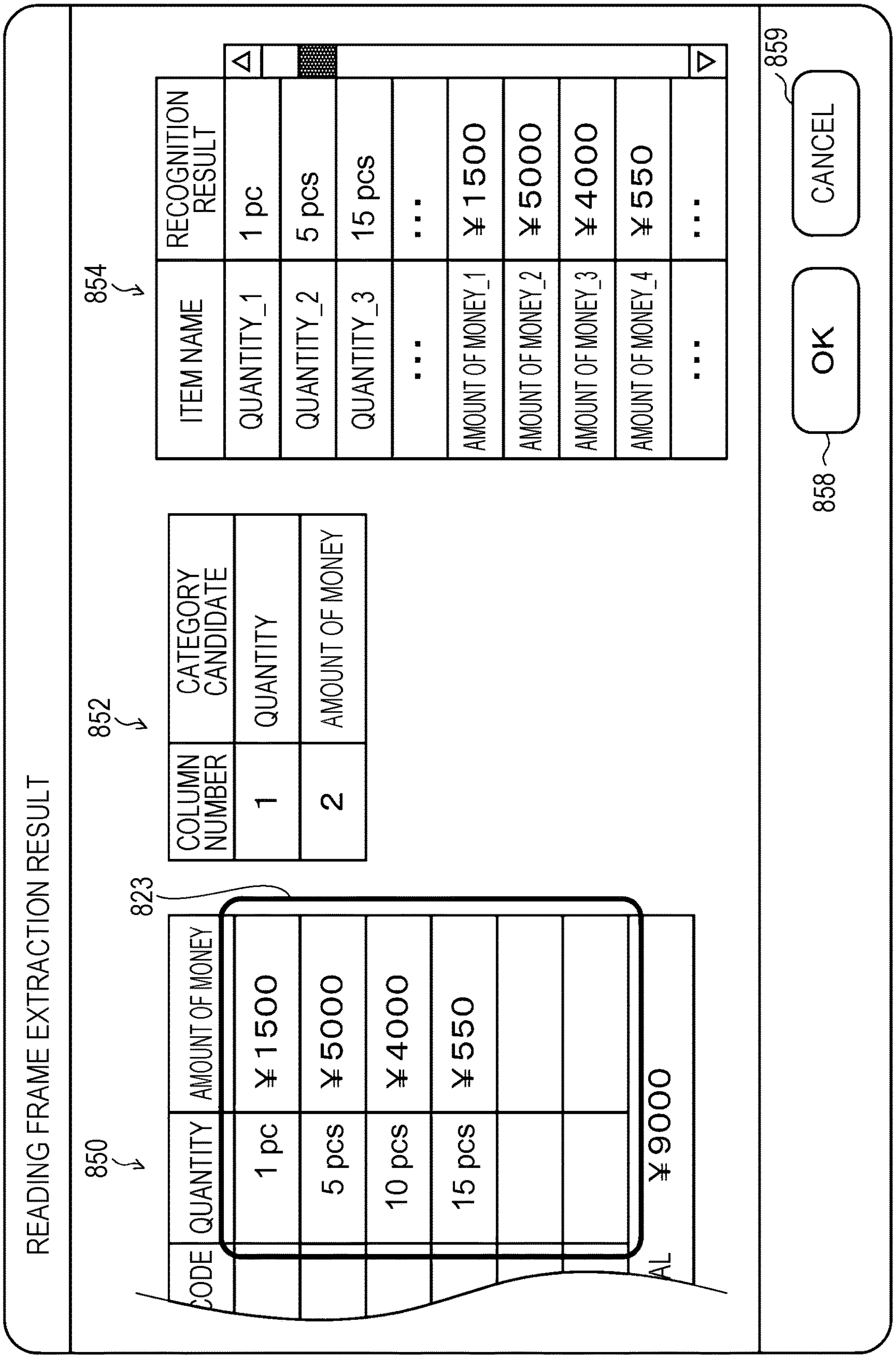
FIG. 10 is a diagram illustrating an example of a display screen in the process for creating a reading frame.

FIG. 10 illustrates an example of a display screen in the process for creating a reading frame. FIG. 10 is a diagram illustrating, as a screen 85, an example of a screen on which information including a result of the process for extracting a reading frame (step S100) is displayed.

As illustrated in FIG. 10, an image 850 including at least a form area (reading frame 823) for which an arithmetic expression is to be defined is displayed in the screen 85. The screen 85 also includes a display area 852 for displaying category candidates and a display area 854 for displaying an OCR result. The screen 85 also includes an OK button 858 as a button for causing the process to proceed and a cancel button 859 for canceling the process.

The display area 852 for displaying category candidates allows the user to edit information displayed as category candidates. The display area 854 for displaying an OCR result can link the OCR result and an image of a form to each other by highlighting or marking a part of the image 850 in the reading frame 823 when the user selects a position of a corresponding item name.

Next, the unit extraction process (step S112 illustrated in FIG. 8) will be described in detail.

Figure 11:
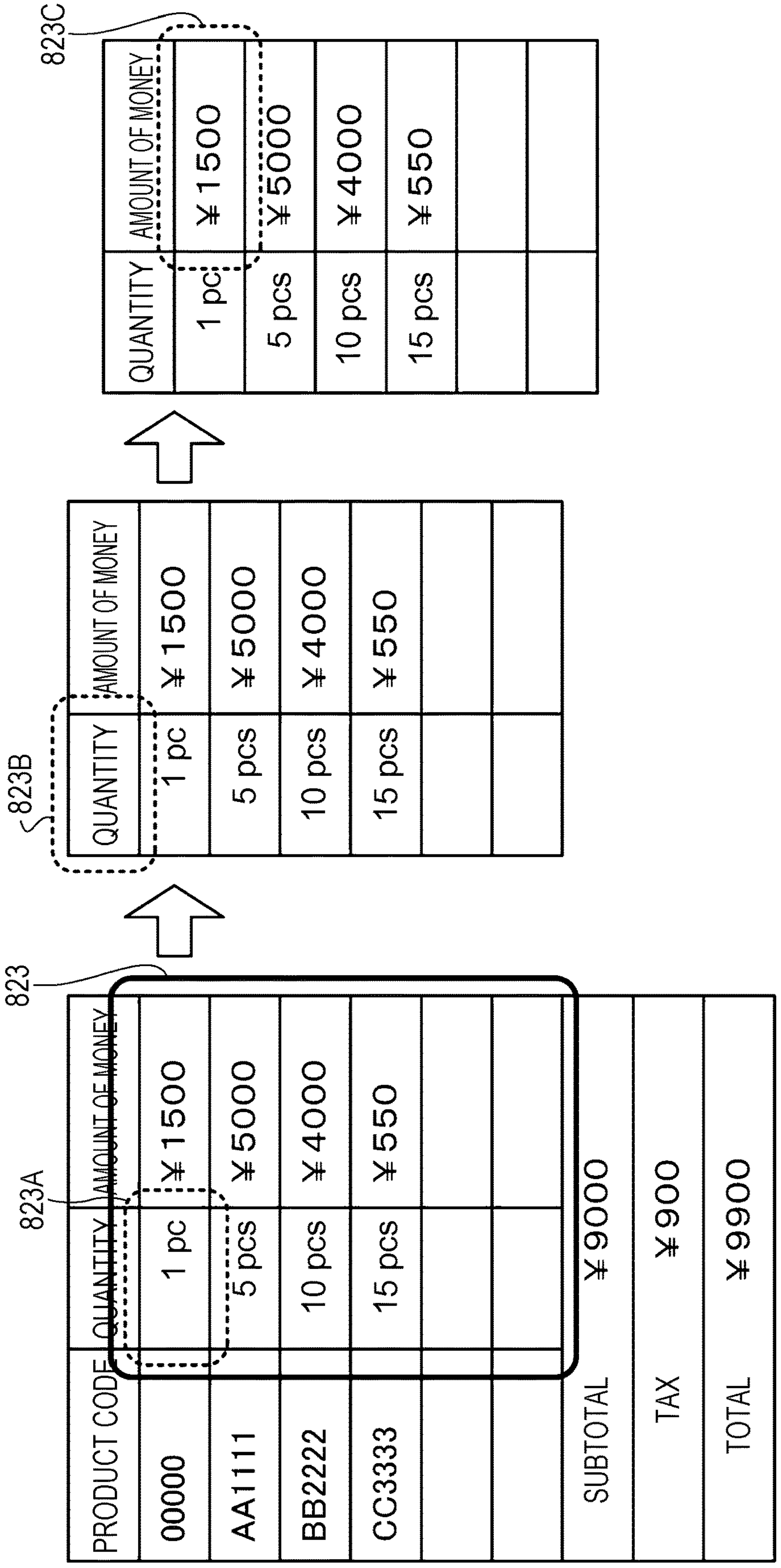
FIG. 11 is a diagram illustrating a unit extraction process.

FIG. 11 is a diagram illustrating the unit extraction process.

In the unit extraction process, character string information that serves as a unit in an arithmetic expression is found in a reading frame and extracted. For example, character string information is searched for a character string that serves as a unit candidate in units of sub-frames of the tabular format, and the character string is extracted. In the present exemplary embodiment, three types of search process are performed. In the example illustrated in FIG. 11, whether a sub-frame 823A indicating character string information "1 piece" includes character string information that serves as a unit candidate is determined as a first search process. Whether a sub-frame 823B immediately above the sub-frame 823A includes character string information that serves as a unit candidate is then determined as a second search process. Whether a sub-frame 823C immediately to the right of the sub-frame 823A includes character string information that serves as a unit candidate is then determined as a third search process.

Figure 12:
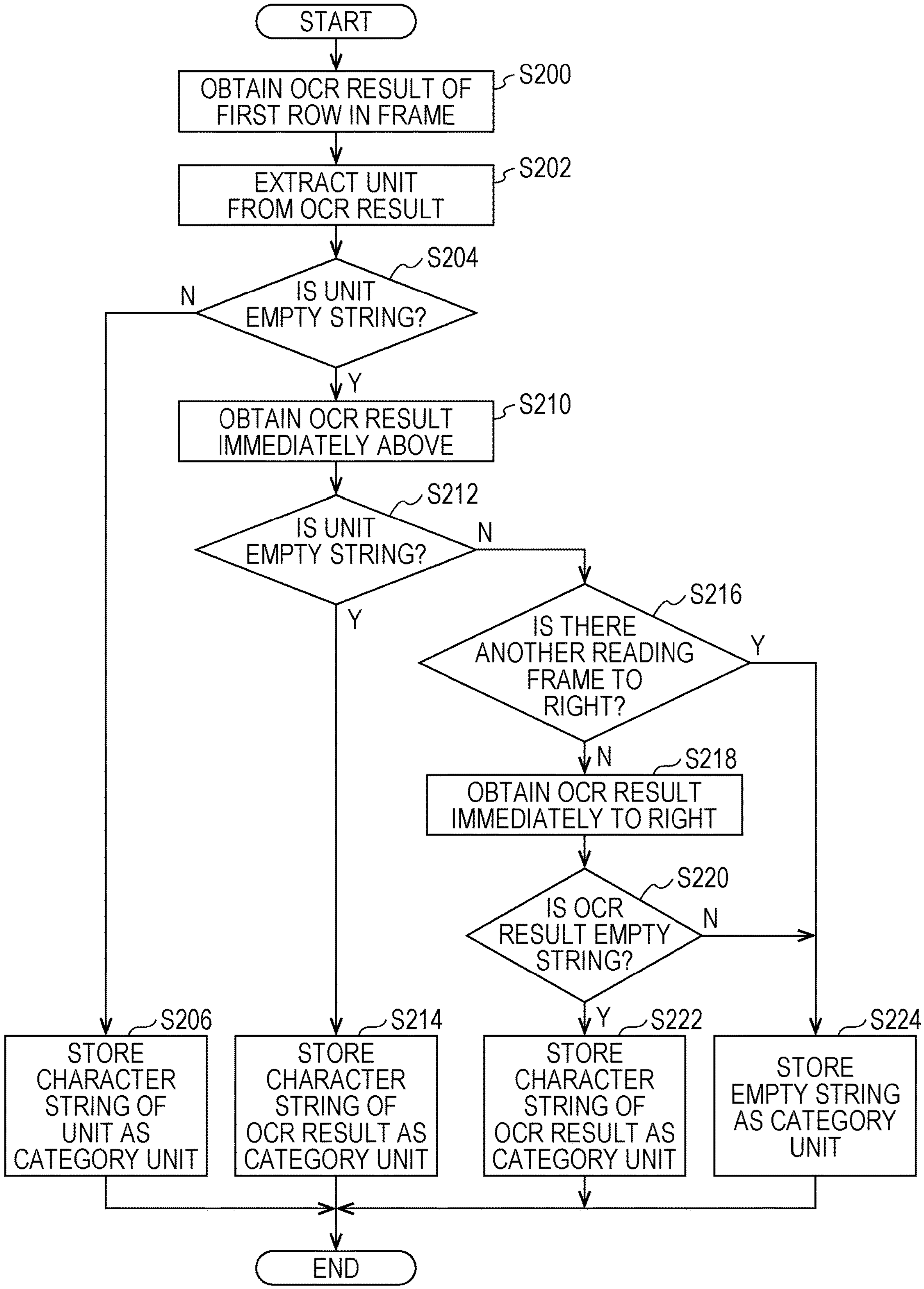
FIG. 12 is a flowchart illustrating an example of a procedure of the unit extraction process.

FIG. 12 is a flowchart illustrating an example of a procedure of the unit extraction process (step S112 in FIG. 8). When the information processing apparatus 20 is instructed to activate the unit extraction process included in the information processing program 25P, the CPU 22 performs the following steps.

In step S200, the CPU 22 obtains an OCR result (character string information) of a first row in an extracted reading frame. In a next step S202, a unit (character string information indicating a unit) is extracted from the OCR result (character string information) of the first row in the extracted reading frame.

Figure 13:
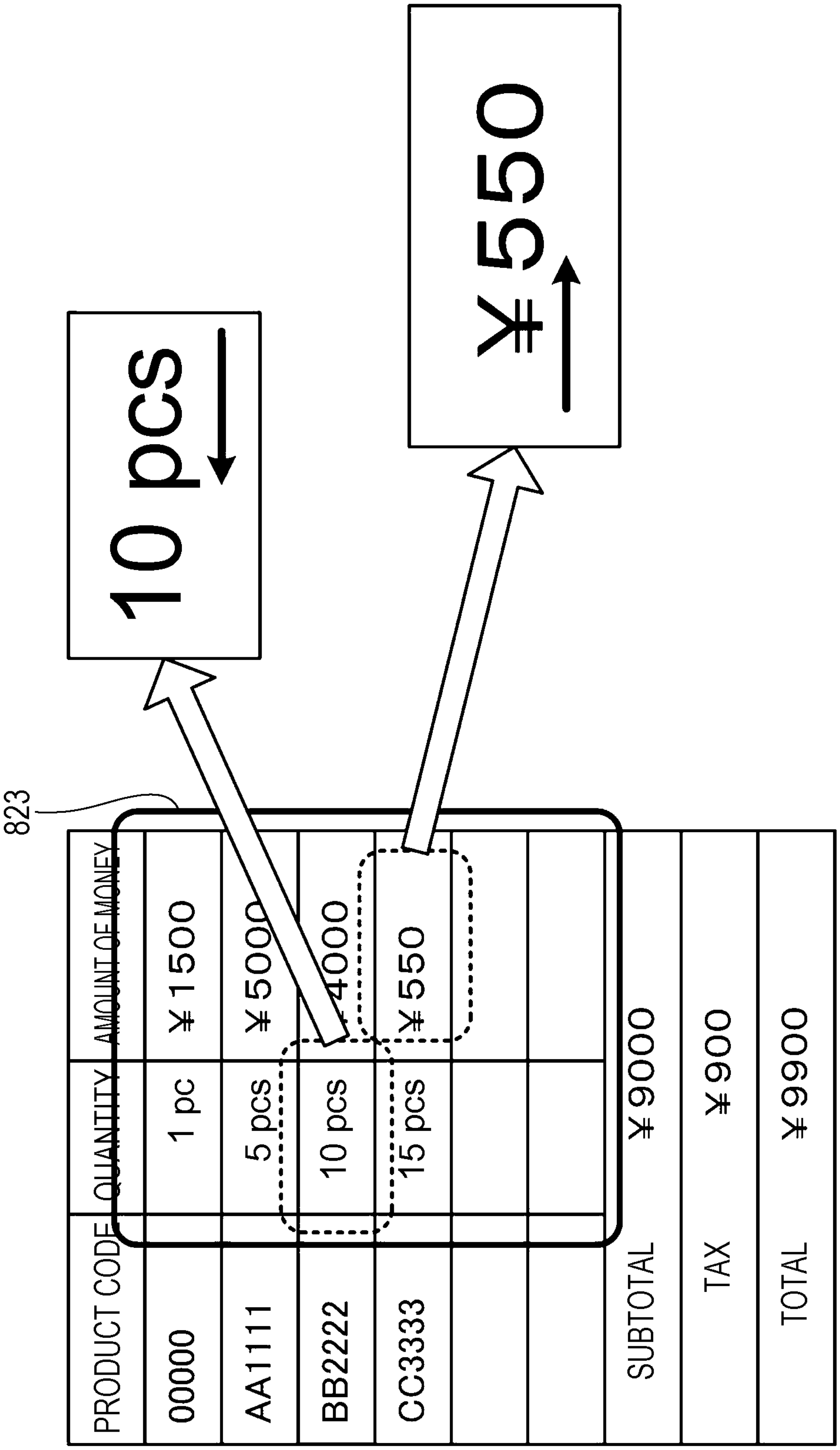
FIG. 13 is a diagram illustrating a process for extracting a unit from an OCR result.

FIG. 13 is a diagram illustrating a process for extracting a unit from an OCR result (the processing in step S202).

In step S202, a word is extracted from a beginning or an end (from the left or the right) of the character string information until character string information indicating a value is obtained from the obtained character string information. FIG. 13 illustrates an example of a case where a word is extracted from an end (from the right) of character string information "10 pcs" and an example of a case where a word is extracted from a beginning (from the left) of character string information "¥550". When a word is extracted from a beginning (from the left) of character string information, only one character may be extracted. This is because a certain sign or character, such as a unit for the amount of money, is likely to be provided at a beginning.

Figure 14:
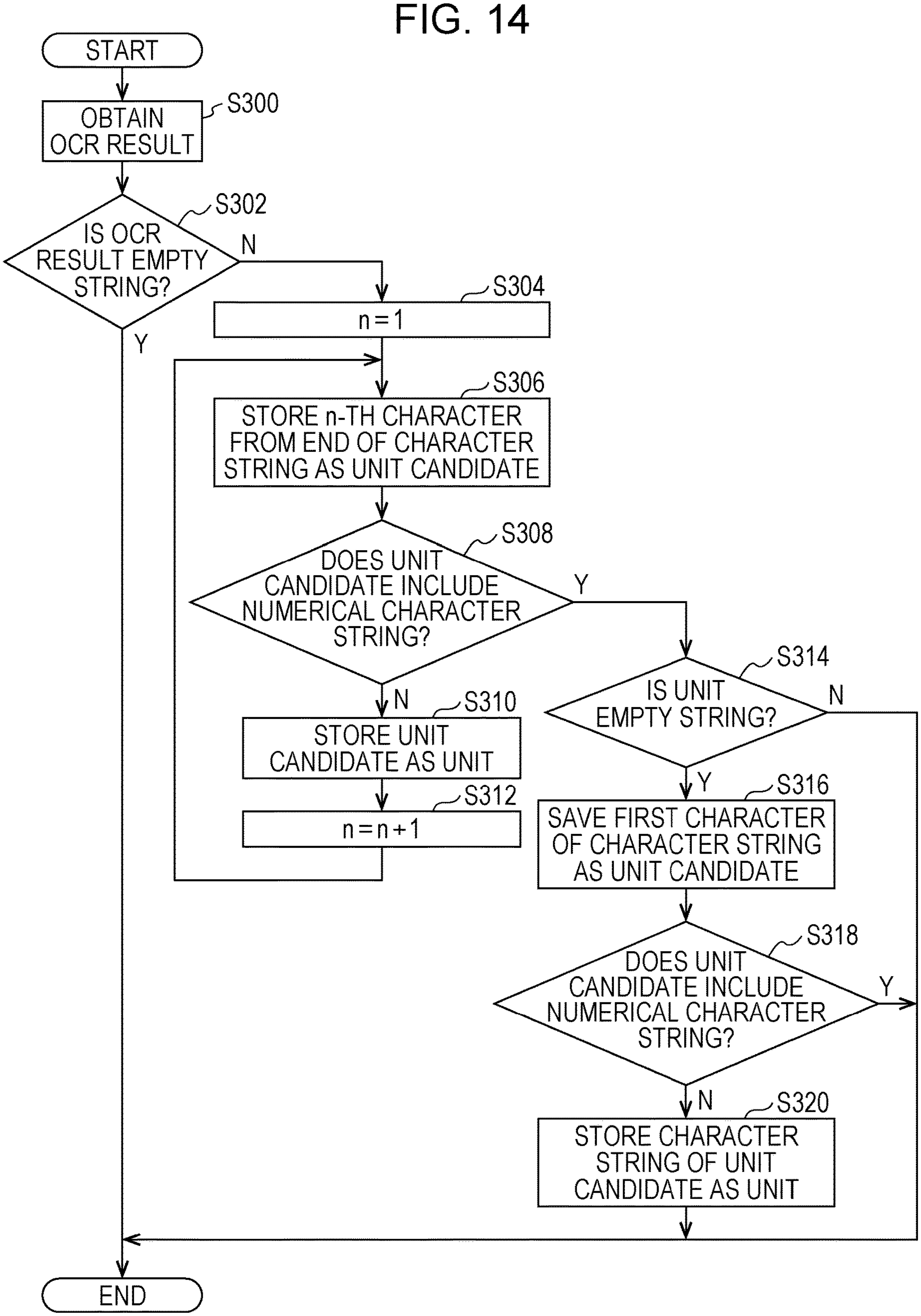
FIG. 14 is a flowchart illustrating an example of a procedure of the process for extracting a unit from an OCR result.

FIG. 14 is a flowchart illustrating an example of a detailed procedure of the process for extracting a unit from an OCR result (the processing in step S202).

In step S300 of the process for extracting a unit, the CPU 22 obtains an OCR result (character string information) and saves the obtained OCR result as character string information indicating a unit and character string information indicating a unit candidate. Next, in step S302, the CPU 22 determines whether the OCR result is an empty string, that is, a blank space, by determining whether the obtained character string information is an empty string. If a result of step S302 is positive, the processing routine ends.

If the OCR result is not an empty string, on the other hand, the CPU 22 determines that the result of step S302 is negative and performs a process for extracting character string information indicating a unit candidate and storing the character string information as character string information indicating a unit. More specifically, the CPU 22 sets the counter variable n at "1" in step S304 and, in step S306, extracts an n-th character from an end of the OCR result (character string) of the first row and stores the n-th character as character string information indicating a unit candidate.

Next, in step S308, the CPU 22 determines whether the unit candidate includes a numeric character string. If a result of step S308 is negative, the CPU 22 stores the character string information indicating a unit candidate as character string information indicating a unit. In a next step S312, the CPU 22 increments the counter variable n (n=n+1) and causes the process to return to step S306.

If the unit candidate does not include a numeric character string and the result of step S308 is positive, on the other hand, the CPU 22 determines in step S314 whether character string information stored as a unit is an empty string. If a result of step S314 is negative, the processing routine ends. If the result of step S314 is positive, the CPU 22 saves, in step S316, a first character at a beginning of the character string as character string information indicating a unit candidate. Next, in step S318, the CPU 22 determines whether the unit candidate includes a numeric character string. If a result of step S318 is positive, the processing routine ends. If the result of step S318 is negative, the CPU 22 stores, in step S320, the character string information indicating a unit candidate as character string information indicating a unit and ends the processing routine.

After the character string information indicating a unit is extracted, the CPU 22 determines, in step S204 in FIG. 12, whether the character string information is an empty string. If a result of step S204 is positive, the process proceeds to step S210. If the result of step S204 is negative, the CPU 22 stores, in step S206, the stored information indicating a unit as character string information indicating a category unit and ends the processing routine.

In step S210, the CPU 22 obtains an OCR result immediately above the first row in the reading frame. Next, in step S212, the CPU 22 determines whether character string information indicating a unit is an empty string. If a result of step S212 is negative, the process proceeds to step S216. If the result of step S212 is positive, the CPU 22 stores, in step S214, the OCR result obtained in step S210 as character string information indicating a category unit and ends the processing routine.

In step S216, the CPU 22 determines whether another reading frame has been detected to the right of the reading frame. If a result of step S216 is negative, the process proceeds to step S218. If the result of step S216 is positive, the CPU 22 stores, in step S224, the character string information indicating an empty string as character string information indicating a category unit and ends the processing routine.

In step S218, the CPU 22 obtains an OCR result immediately to the right of the first row in the reading frame. Next, in step S220, the CPU 22 determines whether the OCR result is an empty string. If a result of step S220 is negative, the process proceeds to step S224. If the result of step S220 is positive, the CPU 22 stores, in step S222, the OCR result obtained in step S218 as character string information indicating a category unit and ends the processing routine.

Next, the category determination process (step S114 in FIG. 8) will be described in detail. In the category determination process, category information indicating a type of unit is identified for character string information indicating a unit in an arithmetic expression by referring to a predetermined category table.

FIG. 15 is a diagram illustrating an example of the category table used for the category determination table. The category table may be stored in the database 25D of the storage unit 25 and used after being obtained from the database 25D.

A character string that serves as a unit candidate can be used to estimate a unit used in an arithmetic expression. In the example illustrated in FIG. 15, for example, an example of character string information (i.e., keywords) belonging to categories of quantity, amount of money, weight, and length are shown. A keyword corresponding to character string information that serves as a unit candidate, therefore, is identified, and the character string information that serves as a unit candidate can be classified into a category to which the identified keyword belongs.

Figure 16:
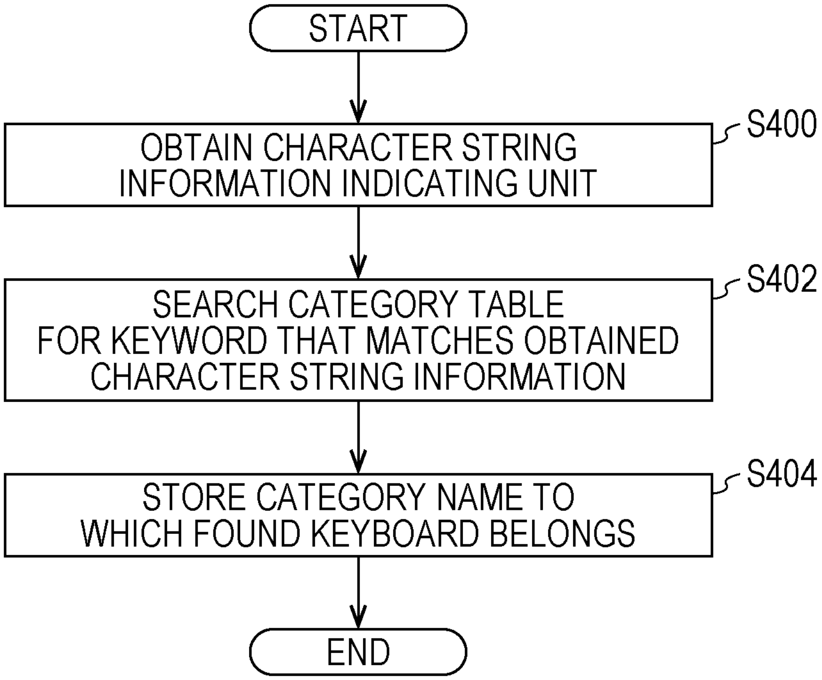
FIG. 16 is a flowchart illustrating an example of a procedure of a category determination process.

FIG. 16 is a flowchart illustrating an example of a detailed procedure of the category determination process (step S114 in FIG. 8). In the present exemplary embodiment, the category determination process is performed using the category table illustrated in FIG. 15.

In step S400 of the category determination process, the CPU 22 obtains character string information indicating a unit. Next, in step S402, the CPU 22 searches the category table (FIG. 15) for a keyword corresponding to the obtained character string information. Next, in step S404, the CPU 22 stores a search result as category information, that is, stores a category name, and ends the processing routine.

If an applicable keyword is not found in step S402, information indicating "no category" may be stored as category information.

Next, the process for defining an arithmetic expression (step S40 in FIG. 4) will be described in detail.

The information processing apparatus 20 obtains information to be used to define a conditional expression as an arithmetic expression and defines the arithmetic expression using the obtained information. In the process for defining an arithmetic expression, the information processing apparatus 20 predicts an arithmetic expression including an operator by referring to a predetermined prediction table using various pieces of obtained information as described above.

FIG. 17 is a diagram illustrating an example of the predetermined prediction table for predicting an arithmetic expression including an operator, the prediction table being used to define an arithmetic expression. The prediction table may be stored in the database 25D of the storage unit 25 and used after being obtained from the database 25D.

In an arithmetic expression, an operator is provided between a plurality of terms. Each of the plurality of terms can be classified into a category, and a possible operator corresponding to one of basic arithmetic operations can then be identified on the basis of a combination of categories. In the prediction table illustrated in FIG. 17, an operator between a left-side term and a right-side term is specified in advance as a predicted operator. The predicted operator may be determined, for example, as one of operators corresponding to the basic arithmetic operations (addition, subtraction, multiplication, and division) for each combination of categories on the basis of information specifying statistical definition frequencies and relevance such as validity between categories. When categories of the left-side term and the right-side term are "quantity" as in a second record in the example illustrated in FIG. 17, an operator "x" for multiplication is specified in advance.

Operators in the prediction table may be the operator corresponding to the basic arithmetic operations, but are not limited to these. Other operators may also be used. Among the operators corresponding to the basic arithmetic operations, division (÷) is often used when a numerical operation is performed for installments, payment by the day, distribution, and rationing. Subtraction (−) is often used when a campaign coupon discount is applied. Multiplication (×) is often used for calculating the amount of money, but addition (+) is used when different values are added up. The operators may be determined on the basis of not only categories but also information indicating types of numerical calculation.

In addition, the predetermined predicted operators on the prediction table need not necessarily be fixed. The prediction table may be updated in accordance with changes in the user's definition frequency, instead. More specifically, a history relating to definition of operation checks may be stored, and the predicted operators may be updated to operators defined in the history at frequencies exceeding a predetermined threshold, that is, operators for different combinations of categories of a left-side term and a right-side term. Alternatively, a prediction table updated on the basis of the user's definition frequency may be created as a user table separate from a prediction table stored in advance.

FIG. 18 is a diagram illustrating an example of a prediction table (user table) updated in accordance with changes in the user's definition frequency. In FIG. 18, the user has defined the second record in the definition history at a frequency exceeding a threshold, and the operator "×" for multiplication has been changed to the operator "+" for addition.

The user table is not limited to use of a history relating to definition of operation checks. For example, the user table may be updated through learning based on the operation of the information processing apparatus 20, instead.

Figure 19:
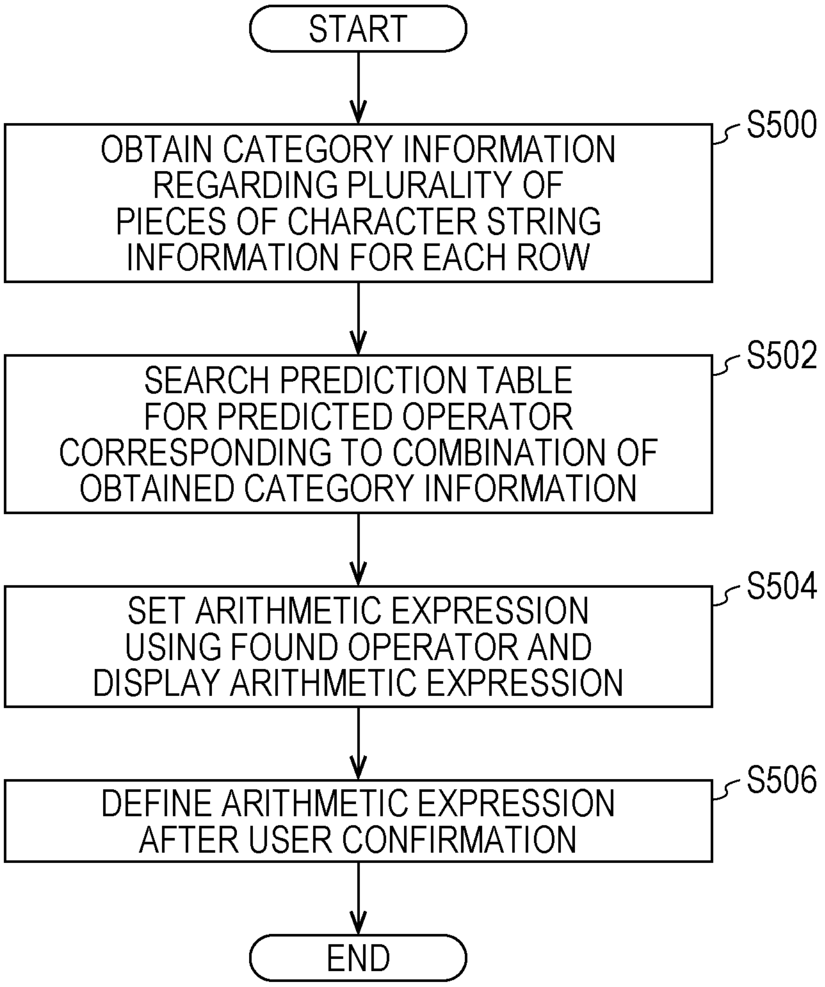
FIG. 19 is a flowchart illustrating an example of a procedure of a process for defining an arithmetic expression.

FIG. 19 is a flowchart illustrating an example of a detailed procedure of the process for defining an arithmetic expression (step S40 in FIG. 4). In the present exemplary embodiment, the process for defining an arithmetic expression is performed using the prediction table illustrated in FIG. 17.

In step S500 of the process for defining an arithmetic expression, the CPU 22 obtains category information regarding each of a plurality of pieces of character string information for each row. Next, in step S502, the CPU 22 searches the prediction table (FIG. 17) for a predicted operator corresponding to a combination of the obtained category information. Next, in step S504, the CPU 22 sets an arithmetic expression using the found operator and displays the arithmetic expression. Next, in step S506, the CPU 22 defines the arithmetic expression after user confirmation and stores a result of the definition. The processing routine then ends.

Figure 20:
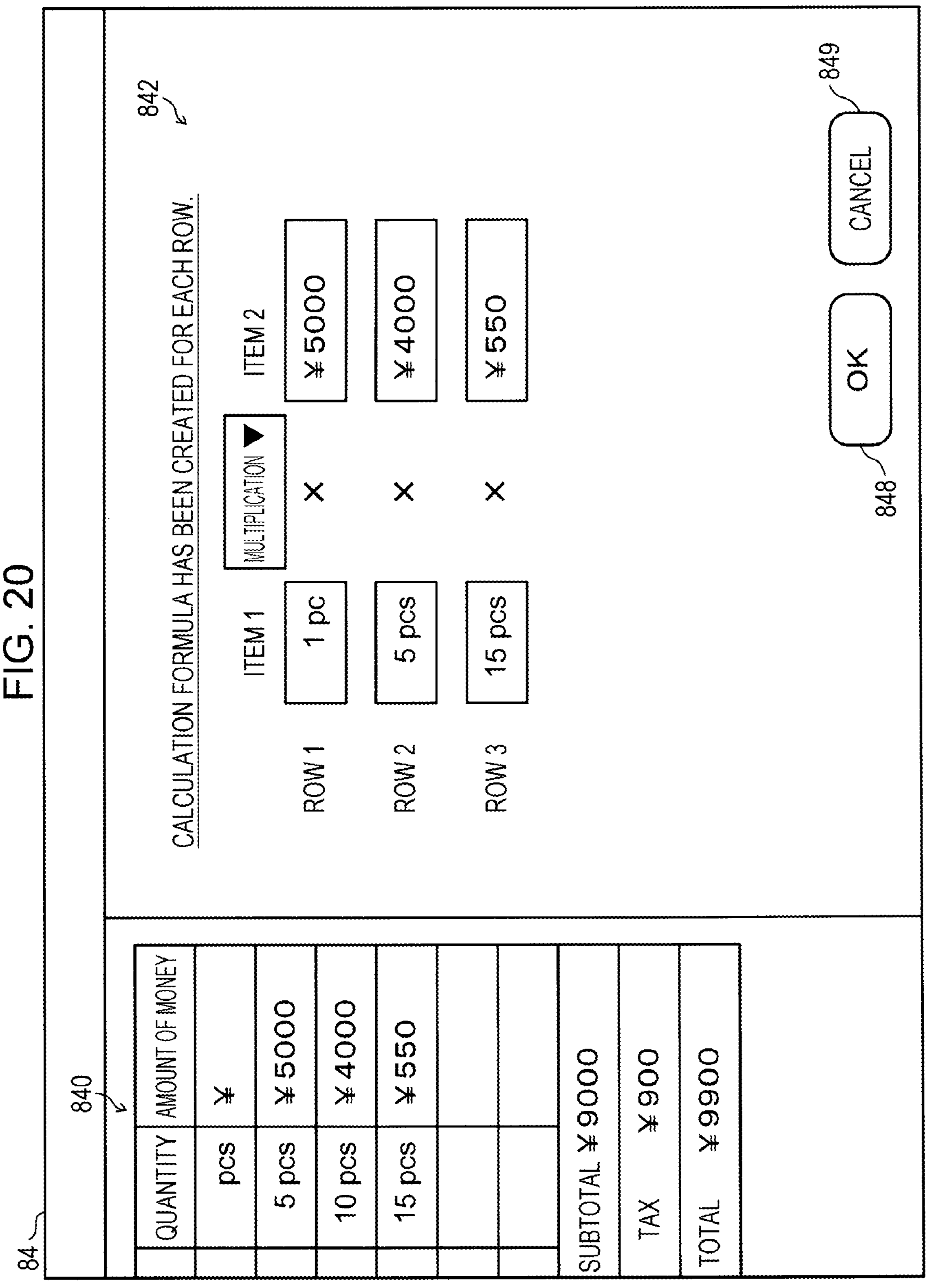
FIG. 20 is a diagram illustrating an example of an inquiry screen for an arithmetic expression.

FIG. 20 is a diagram illustrating an example of an inquiry screen for an arithmetic expression, the screen being displayed in the process for defining an arithmetic expression.

As illustrated in FIG. 20, an image 840 including at least a form area (reading frame) for which an arithmetic expression is to be defined is displayed in an inquiry screen 84. The inquiry screen 84 also includes a display area 842 for displaying a created arithmetic expression in detail. The inquiry screen 84 also includes an OK button 848 for defining an arithmetic expression and a cancel button 849 for canceling the definition.

The display area 842 includes parts for displaying left-side terms, right-side terms, and predicted operators. The parts for displaying left-side terms and right-side terms may be text boxes or the like so that the user can correct the left-side terms and the right-side terms. Because categories of character string information in a reading frame are the same between different rows of a table, the same predicted operator is set. The set predicted operator may be a pull-down menu or the like so that the user can correct the predicted operator or select another operator. Although the same predicted operator is set for the same category in the example illustrated in FIG. 20, an operator may be displayed in a correctable manner for each row of a table, instead.

Next, verification of an arithmetic expression will be described.

An arithmetic expression for numerical calculation on a form often includes operation terms (the left-side term and the right-side term) and an operation result term on the form. An estimated arithmetic expression, therefore, can be verified by using the operation terms and the operation result terms on the form. In doing so, accuracy of the defined arithmetic expression improves compared to when an arithmetic expression is defined without verification.

The reading frame 823 in the tabular format in the example illustrated in FIG. 9, for example, includes character string information indicating operation terms but does not include character string information indicating an operation result term. Character string information (a field "subtotal" in FIG. 9) indicating an operation result term, however, is included in another frame. In the present exemplary embodiment, another frame relating to an arithmetic expression may also be set in order to improve the accuracy of a defined arithmetic expression.

Figure 21:
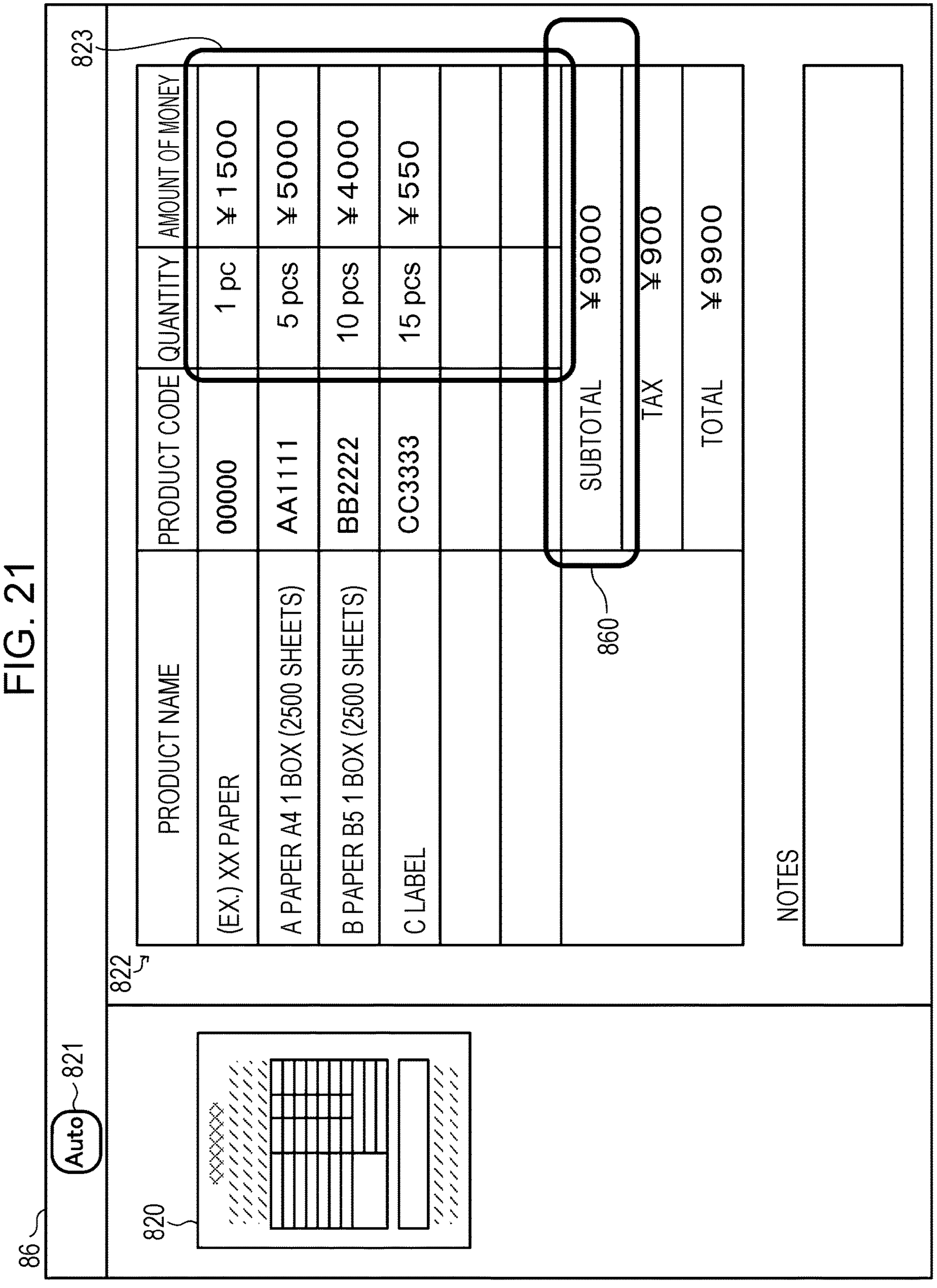
FIG. 21 is a diagram illustrating another example of the creation screen for a reading frame.

FIG. 21 is a diagram illustrating an example of a creation screen for a reading frame for improving the accuracy of an arithmetic expression.

As illustrated in FIG. 21, the scan image (image 820) and the reading frame 823 are displayed in the creation screen 86 as in the creation screen 82 illustrated in FIG. 9. Another reading frame 860 for verifying an arithmetic expression is also created at a position different from that of the reading frame 823.

In the process for creating a reading frame for verifying an arithmetic expression, in which the reading frame 860 is created, a frame surrounding part of terms of the arithmetic expression may also be set when the arithmetic expression is defined, in order to verify the predicted arithmetic expression. The process for creating a reading frame for verifying an arithmetic expression may be performed in the process for creating the reading frame 823. More specifically, in the process for creating a reading frame for verifying an arithmetic expression, a range specified by the user may be extracted as the reading frame 860, or other ranges including character string information (e.g., numerical information) at positions different from that of the reading frame 823 may be automatically extracted and the user may select one of the ranges.

Figure 22:
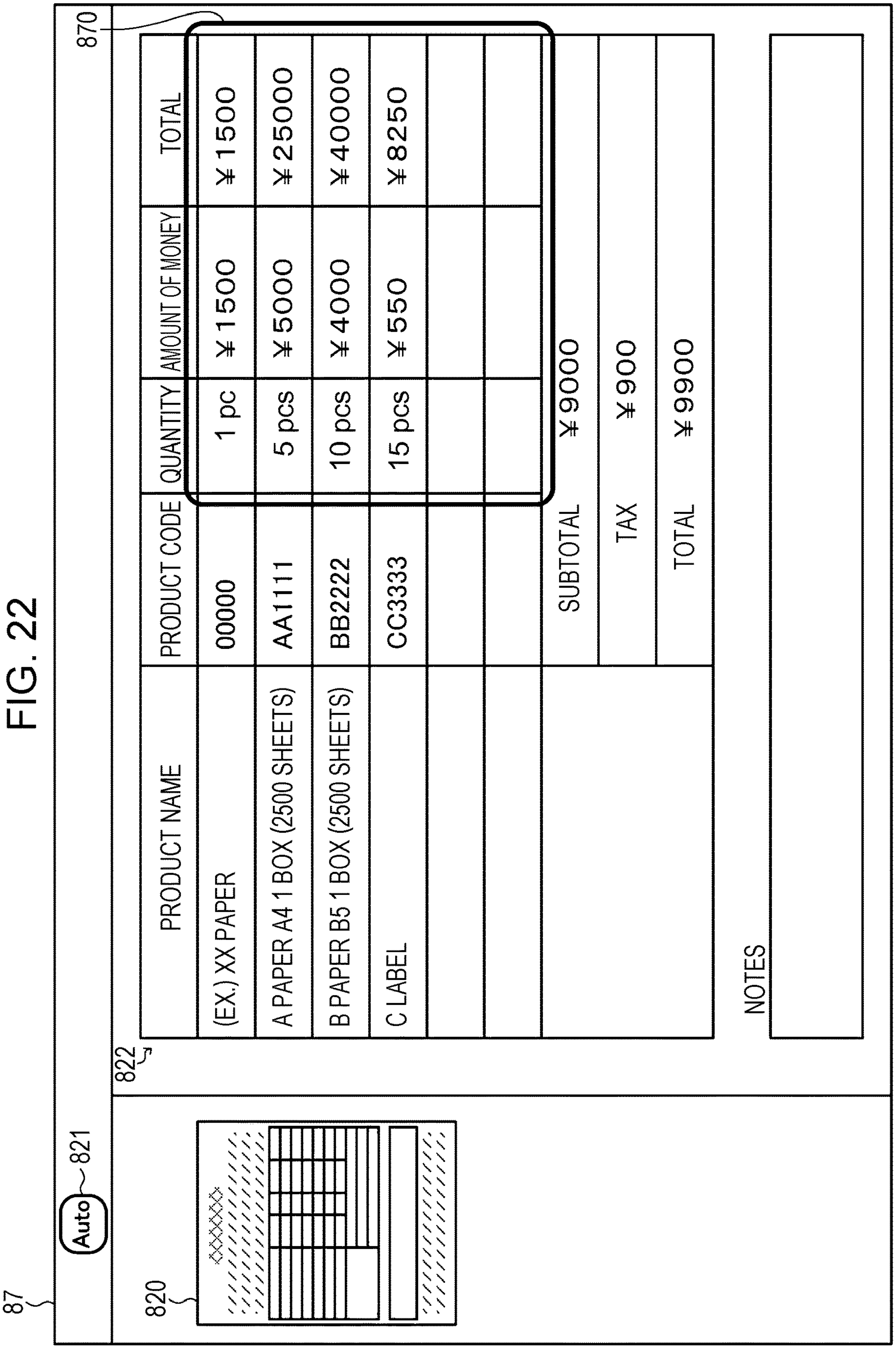
FIG. 22 is a diagram illustrating another example of the creation screen for a reading frame.

As illustrated in FIG. 22 as a creation screen 87, when a reading frame 870 includes character string information indicating operation terms and character string information indicating an operation result term, correspondences between the plurality of pieces of character string information in the reading frame and the right-side term, the left-side term, the operation result term, and the like may be estimated to estimate an arithmetic expression.

As described above, according to the presents exemplary embodiment, a burden on the user in making settings can be reduced compared to when the user needs to sequentially select a plurality of pieces of character string information for numerical operations written on a form to set an arithmetic expression.

An information processing apparatus according to an exemplary embodiment has been described as an example. In another embodiment, a program for causing a computer to execute the function of the components of the information processing apparatus may be implemented. In another embodiment, a computer readable medium storing the program may be implemented.

The configuration of the information processing apparatus described in the above embodiment is an example, and may be modified in accordance with a situation without deviating from the scope of the present disclosure.

The procedures of the processes achieved by the programs described in the above exemplary embodiment are also examples, and unnecessary steps may be removed, new steps may be added, or processing order may be changed without deviating from the scope of the present disclosure.

Although the processes according to the above exemplary embodiment are achieved with a software configuration by executing the programs using a computer, the processes need not be achieved with the software configuration. The processes may be achieved with, for example, a hardware configuration or a combination of a hardware configuration and a software configuration, instead.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising: 1.

a memory; and a processor configured to:

obtain image data on which optical character recognition (OCR) processing is performed;

identify two set strings each comprising a unit and numerical information, located in adjacent columns within a same row of a table included in the image data;

extract the unit from each of the two set strings by parsing characters from the respective set string:

classify the extracted unit of each of the two set strings into a category by comparing the extracted unit to a category table stored in the memory;

determine an operator corresponding to the identified two set strings by referring to a combination of the categories of the two set strings in a prediction table stored in the memory; and provide an arithmetic expression using the operator applicable to the two set strings in the same row of the table.

2. The information processing apparatus according to claim 1, wherein the unit indicates at least quantity, amount of money, weight, or length.

3. The information processing apparatus according to claim 2, wherein, in the prediction table, the operation between a left-side term and a right-side term is specified in advance as a predicter operator.

4. The information processing apparatus according to claim 3, wherein the arithmetic expression includes an operation term in which the operator is used between numerical information of the two set strings and, as an operation result, numerical information included in a set string other than the two set strings.

5. A non-transitory computer readable medium storing a program causing a computer to execute a process for processing information, the process comprising:

obtaining image data on which optical character recognition (OCR) processing is performed;

identifying two set strings each comprising a unit and numerical information, located in adjacent columns within a same row of a table included in the image data;

extracting the unit from each of the two set strings by parsing characters from the respective set string:

classifying the extracted unit of each of the two set strings into a category by comparing the extracted unit to a category table stored in a memory;

determining an operator corresponding to the identified two set strings by referring to a combination of the categories of the two set strings in a prediction table stored in a memory; and providing an arithmetic expression using the operator applicable to the two set strings in the same row of the table.

6. A method for processing information, the method comprising:

obtaining image data on which optical character recognition (OCR) processing is performed;

identifying two set strings each comprising a unit and numerical information, located in adjacent columns within a same row of a table included in the image data;

extracting the unit from each of the two set strings by parsing characters from the respective set string:

classifying the extracted unit of each of the two set strings into a category by comparing the extracted unit to a category table stored in a memory;

determining an operator corresponding to the identified two set strings by referring to a combination of the categories of the two set strings in a prediction table stored in a memory; and providing an arithmetic expression using the operator applicable to the two set strings in the same row of the table.

* * * * *